(12) United States Patent
Yamaguchi

(10) Patent No.: US 7,333,115 B2
(45) Date of Patent: Feb. 19, 2008

(54) IMAGE PROCESSING APPARATUS AND METHOD THEREOF

(75) Inventor: Yuji Yamaguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 890 days.

(21) Appl. No.: 10/467,542

(22) PCT Filed: Dec. 11, 2002

(86) PCT No.: PCT/JP02/12965

§ 371 (c)(1),
(2), (4) Date: Aug. 8, 2003

(87) PCT Pub. No.: WO03/050759

PCT Pub. Date: Jun. 19, 2003

(65) Prior Publication Data
US 2004/0111489 A1    Jun. 10, 2004

(30) Foreign Application Priority Data
Dec. 12, 2001 (JP) .............................. 2001-379350

(51) Int. Cl.
*G06T 15/00* (2006.01)
(52) U.S. Cl. ........................... 345/505; 711/122; 707/2
(58) Field of Classification Search ................ 345/505; 711/122, 117–118, 145–146; 707/2
See application file for complete search history.

(56) References Cited

U.S. PATENT DOCUMENTS 5,903,908 A    5/1999    Singh et al. ................. 711/122

6,662,173 B1 *  12/2003   Hammarlund et al. ......... 707/2

(Continued)

FOREIGN PATENT DOCUMENTS

JP    58-82357    5/1983

(Continued)

OTHER PUBLICATIONS

Michael Eldrige et al., "Pomegranate: A Fully Scalable Graphics Architecture", Computer Graphics Proceedings, Annual Conference Series, 2000, pp. 443-454, New Orleans, LA.

(Continued)

*Primary Examiner*—Phu K. Nguyen
(74) *Attorney, Agent, or Firm*—Finnegan, Henderson, Farabow, Garrett & Dunner, L.L.P.

(57) ABSTRACT

An image processing apparatus which can reduce overlapping access, does not need a crossbar, can be easily designed, and can reduce an interconnect cost and an interconnect delay and a method of the same, wherein a global module 12 has a global cache 121, outputs data in the global cache in accordance with a request to a local module issuing the request when receiving a local cache fill request from a local module, a plurality of local modules 13-0 to 13-3 have memory modules, local caches, and processing units for performing the processing they are in charge of based on operation parameters and the processing data of the local caches and, when the processing data required for the processing is not in the local cache, output local cache fill requests for requesting the required data and update the local caches by the sent data in response to the requests.

31 Claims, 18 Drawing Sheets

U.S. PATENT DOCUMENTS 6,904,499 B2 * 6/2005 Fanning ..................... 711/122

FOREIGN PATENT DOCUMENTS

JP           3-48979        3/1991
JP        2001-273191    10/2001

OTHER PUBLICATIONS

Michael Cox et al., "Multi-Level Texture Caching for 3D Graphics Hardware", Computer Architecture, 1998, pp. 86-97, Los Alamitos, CA.

Homan Igehy et al, "Parallel Texture Caching", Eurographics/Siggraph Workshop on Graphics Hardware ACM, 1999, pp. 95-106, New York, NY.

Se-Jeong Park et al., "A Reconfigurable Multilevel Parallel texture Cache Memory With 75-GB/s Parallel Cache Replacement Bandwidth", Journal of Solid-State Circuits, 2002, pp. 612-623, Piscataway, NJ.

* cited by examiner

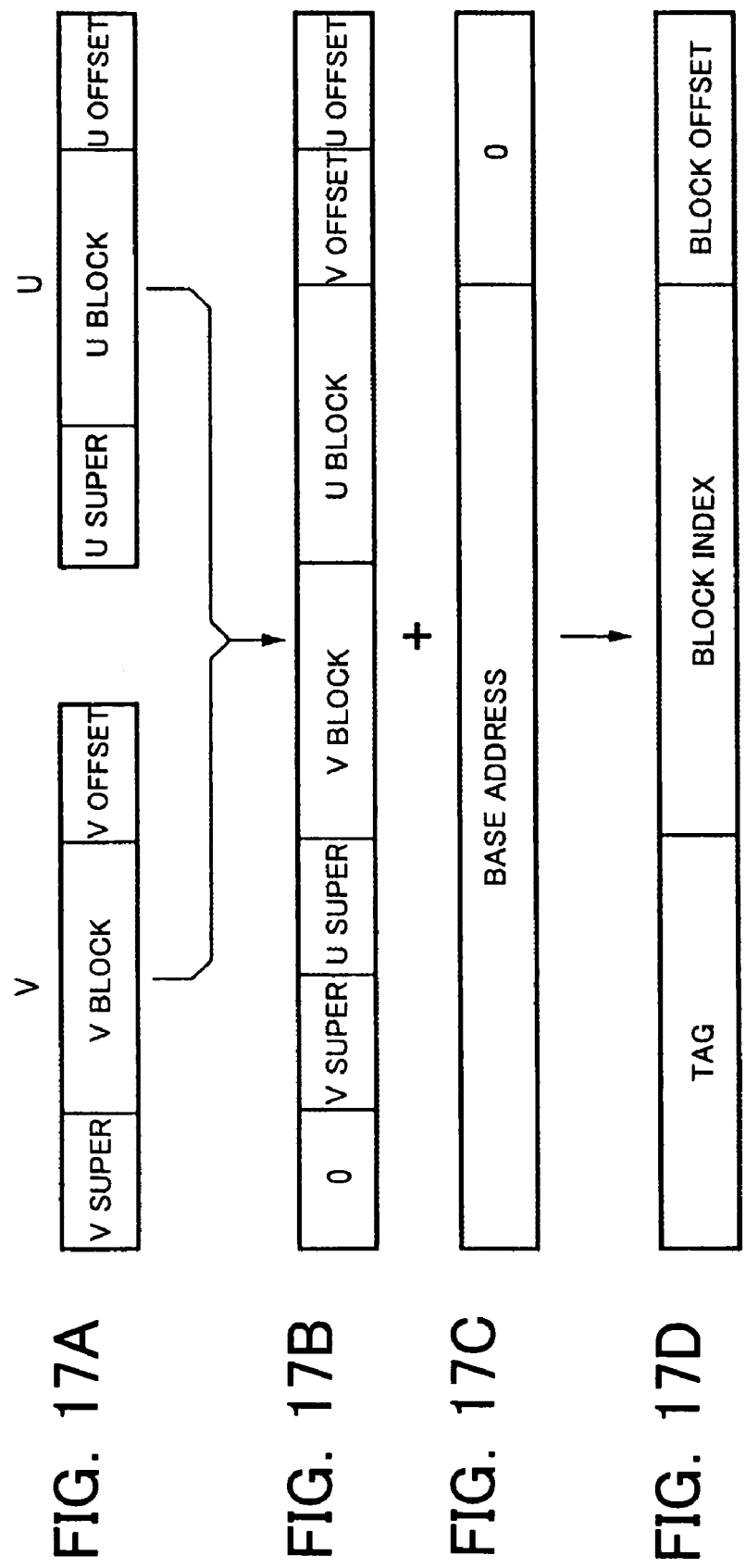

IMAGE PROCESSING APPARATUS AND METHOD THEREOF

TECHNICAL FIELD

The present invention relates to an image processing apparatus wherein a plurality of processing devices share processing data to perform parallel processing and a method of the same.

BACKGROUND ART

In recent years, graphic LSIs for executing 3D computer graphics by hardware at a high speed have spread remarkably. In particular, in game systems and personal computers (PC), such graphic LSIs are often mounted as standard equipment.

Further, the technological advances being made in graphic LSIs have been fast. Expansion of functions such as in the "Vertex Shader" and "Pixel Shader" employed in "DirectX" have been continuing and performance has been improved at a pace faster than that of the CPUs.

In order to improve the performance of a graphic LSI, it is effective not only to raise the operating frequency of the LSI, but also to utilize the techniques of parallel processing. The techniques of parallel processing may be roughly classified as follows.

First is a parallel processing method by area division, second is a parallel processing method at a primitive level, and third is a parallel processing method at a pixel level.

The above classification is based on the particle size of the parallel processing. The particle size of the area division parallel processing is the roughest, while the particle size of the pixel level parallel processing is the finest. These techniques will be summarized below.

Parallel Processing by Area Division

This is a technique dividing a screen into a plurality of rectangular areas and performing parallel processing while assigning areas for a plurality of processing units to take charge of.

Parallel Processing at Primitive Level

This is a technique of imparting different primitives (for example triangles) to a plurality of processing units and making them operate in parallel.

A view conceptually showing parallel processing at the primitive level is shown in FIG. 1.

In FIG. 1, PM0 to PMn-1 indicate different primitives, PU0 to PUn-1 indicate processing units, and MM0 to MMn-1 indicate memory modules.

When primitives PM0 to PMn-1 having a relatively equal large size are given to the processing units PU0 to PUn-1, the loads on the processing units PU0 to PUn-1 are balanced and efficient parallel processing can be carried out.

Parallel Processing at Pixel Level

This is the technique of parallel processing of the finest particle size.

FIG. 2 is a view conceptually showing parallel processing at the primitive level based on the technique of parallel processings at the pixel level.

As shown in FIG. 2, in the technique of parallel processing at the pixel level, when rasterizing triangles, pixels are generated in units of rectangular areas referred to as "pixel stamps PS" comprised of pixels arrayed in a 2×8 matrix.

In the example of FIG. 2, a total of eight pixel stamps from the pixel stamp PS0 to the pixel stamp PS7 are generated. A maximum of 16 pixels included in these pixel stamps PS0 to PS7 are simultaneously processed.

This technique has an efficiency in parallel processing better by the amount of fineness of the particle size in comparison with the other techniques.

In the case of parallel processing by area division explained above, however, in order to make the processing units operate in parallel efficiently, it is necessary to classify objects to be drawn in the areas in advance, so the load of the scene data analysis is heavy.

Further, when not starting drawing after one frame's worth of the scene data is all present, but drawing in the so-called immediate mode of starting drawing immediately when object data is given, the parallel property cannot be achieved.

Further, in the case of parallel processing at the primitive level, in actuality, there is variation in sizes of the primitives PM0 to PMn-1 composing the object, so a difference arises in the time for processing one primitive among the processing units PU0 to PUn-1. When this difference becomes large, the areas which the processing units draw in also largely differ and the locality of the data is lost, so for example the DRAM comprising the memory modules frequently makes page errors and the performance is lowered.

Further, in the case of this technique, there is also the problem of a high interconnect cost. In general, in hardware for graphics processing, in order to broaden the band width of the memory, a plurality of memory modules is used for memory interleaving.

At this time, as shown in FIG. 1, it is necessary to connect all processing units PU0 to PUn-1 and the built-in memory modules MM0 to MMn-1.

Further, in the case of parallel processing at the pixel level, the size of the primitive processed by the graphics tends to become smaller, therefore even if the size of the pixel stamp is made larger, the result is only that invalid pixels increase. The execution efficiency does not rise.

Accordingly, there is a limit to the number of pixels which can be parallel processed by this technique.

Therefore, it can be considered to employ the following parallel processing technique based on the characteristics of the above parallel processing techniques.

Namely, from the viewpoint of the particle size of the parallel processing, parallel processing at the pixel level is employed.

However, since there is a limit to the degree of parallelism in parallel processing at the pixel level, a plurality of primitives are simultaneously processed.

Further, the processing is distributed to enable the processing units and the memory modules to be directly connected so as to lower the interconnect cost.

FIG. 3 is a view conceptually showing a configuration of the above image processing apparatus employing parallel processing at the pixel level, simultaneously processing a plurality of primitives, and distributing processing to enable the processing units and the memory modules to be directly connected.

An image processing apparatus 1 has, as shown in FIG. 3, a streaming data controller (SDC) 2 and n number of modules 3-0 to 3-$n$-1 connected in parallel with respect to the SDC 2.

The modules 3-0 to 3-$n$-1 include processing units PU (0 to n-1) and memory modules MM (0 to n-1).

In FIG. 3, it is assumed that the memory modules MM0 to MMn-1 are interleaved.

Further, the SDC 2 controls transfer of data with the CPU and an external memory and generates parameters required for the rasterization in the processing units PU0 to PUn-1. These parameters are supplied to all processing units PU0 to PUn-1.

The processing units PU0 to PUn-1 have corresponding memory interleaves determined in advance and generate only pixels which they are in charge of.

FIG. 4 is a view for explaining pixel generation in the image processing apparatus of FIG. 3.

In the example of FIG. 4, the memory is interleaved in units of 4×4 rectangular areas. These rectangular areas will be referred to as "Lstamps (Large stamps)". Here, the number of modules configured by the processing units PU and the memory modules MM shown in FIG. 3 is assumed to be four (3-0 to 3-3). Further, the numerals of the modules and the numerals given to the rectangular areas in FIG. 4 correspond to each other.

Accordingly, in the case of the triangle shown in FIG. 4, the module 3-0 is in charge of two Lstamps, while the modules 3-1 to 3-3 are respectively in charge of three Lstamps.

As will also be understood from FIG. 4, an Lstamp includes many invalid pixels. Therefore, in the image processing apparatus 1 of FIG. 3, it is also possible to further divide the Lstamp into four 2×2 rectangular areas (Small stamps: Sstamps) and process only small stamps Sstamps including valid pixels at a latter stage.

The technique for achieving parallelism in FIG. 3 enables processing to be distributed to enable the processing units and the memory modules to be directly connected in the drawing system of graphic processing and can reduce the interconnect cost.

However, the memory access of the texture read system is different from the memory access of the drawing system, so it becomes necessary to read from a memory belonging to another module.

Accordingly, an interconnect such as some sort of a crossbar is needed for memory access of the texture read system, but when realizing this, the following problems of overlapping access and scalability must be solved.

Overlapping Access

In general, when projecting rectangular areas on a screen into a texture space, they occupy areas having different shapes and sizes.

FIG. 5A and FIG. 5B are views conceptually showing a situation of projecting rectangular areas on a screen into texture space.

Here, it is assumed that the texture data is equally stored in the interleaved memory in the same way as the data of the frame buffer and the z-buffer.

Namely, 4×4 rectangular areas are stored in the memory in modules corresponding to the attached numerals. In the figures, a situation wherein four 4×4 rectangular areas adjacent in the screen space shown in FIG. 5A are projected into the texture space shown in FIG. 5B is shown. For example, the area described as the "Area for Module 3-0" in FIG. 5B indicates the texture data mapped with respect to 4×4 rectangular areas on the screen space in the charge of the module 3-0.

In this case, as shown in FIG. 5A and FIG. 5B, a plurality of other modules are accessed for the texture data stored in a certain module. In addition, the timings for access become different.

Accordingly, when the unit of transfer among modules is a 4×4 texcel unit, the data indicated by the hatching in the texture space of FIG. 5B will be transferred four times.

The transfer of the same data a plurality of times in this way wastes the memory band width constrained according to electrical and physical conditions and invites a drop in performance.

Scalability

FIG. 6 is a view of an example wherein a crossbar which becomes necessary for memory access of a texture read system is realized by the most direct form in a system for parallel processing by a plurality of processing units.

In FIG. 6, a global access bus indicated by "GAB" corresponds to the crossbar for the texture access.

When the number of bits of data read out from one memory module is M bits and the number of parallel processed modules is n, the number of data interconnections required for the texture access is M×n.

When realizing the system shown in FIG. 6 by an LSI, not only are the above (M×n) number of data lines laid in a lateral direction across all modules, but also interconnects in the vertical direction become necessary for connection with the processing units.

A crossbar having such a form causes the disadvantages in realizing scalability such as the interfaces of the processing units, interconnect costs, and interconnect delay.

Processing Unit Interfaces

As indicated by the broken line ovals in FIG. 6, the processing units PU-0 to PUn-1 in the modules 3-0 to 3-$n$-1 require interfaces for receiving the data read out from n number of memory modules MM0 to MMn-1 and selecting required data.

Such interfaces depend upon the number of integrated modules, so must be re-designed whenever the degree of parallelism is changed.

Interconnect Costs

In an ideal state where 100% the read texture data is effectively utilized without having to consider the above overlapping access or increase of band width caused by filtering, the minimum required number of interconnects of the global access bus GAB is calculated.

Now, it is assumed that each processing unit processes 4 pixels per cycle and can simultaneously access four textures.

At this time, even in a state where only one texcel is required per pixel on the average, a band width of 4×4× 32=512 bits is required per module. Accordingly, the interconnect width $W_B$ of the global access bus GAB in the case of a system integrating n number of modules is found as follows:

$$W_B=(512 \times N \times W_P)/N_L$$

Here, $W_P$ is the interconnect pitch, and $N_L$ is the number of layers used for the interconnect. For example, as a reference value in an assumed 0.07p process, when $W_P$=0.9 μand $N_L$=2 are applied, the interconnect width when changing the number of modules becomes as follows:

4 modules: 0.9 mm,
8 modules: 1.8 mm, and
16 modules: 3.6 mm.

When assuming that the chip size is 10 mm square, in the case of 8 modules, 20% of the chip size is used only by the lateral interconnects of the global access bus GAB.

In addition, these values assume the minimum required interconnects in the ideal state. In practice, the number must be at least double for practical performance.

Interconnect Delay

When the process is miniaturized and the operating frequency rises, the delay due to the interconnects becomes dominant. For example, in the case of 1 GHz operation, the length able to be laid is the to be about 1 mm to 2 mm.

Accordingly, in the case of the global access bus GAB shown in FIG. 6, sometimes the length from one end of the bus to the other end exceeds 10 mm. As a result, a pipeline register is required for the interconnects and the read latency increases.

In addition, the interconnect length differs according to the combination of the processing units and the memory modules, therefore there is also the problem that the timing for each combination must also be optimized and design becomes difficult.

DISCLOSURE OF THE INVENTION

An object of the present invention is to provide an image processing apparatus able to reduce overlapping accesses, not needing a crossbar having a large number of interconnects, easy to design, and able to reduce the interconnect costs and interconnect delay when a plurality of processing apparatuses share processing data for parallel processing and a method of the same.

To attain the above object, a first aspect of the present invention is an image processing apparatus where a plurality of modules share processing data for parallel processing, including a global module and a plurality of local modules, the global module having a global cache to which the plurality of local modules are connected in parallel and in which processing data required in the local modules is stored and, when receiving a local cache fill request from a local module, outputting data at the global cache in response to the request to the local module issuing the request, and the plurality of local modules having memory modules for storing data concerning images, local caches for storing at least the processing data, and processing units for the charged processing determined by the corresponding memory interleaving in advance based on operation parameters and processing data stored in the local caches and, when the processing data required for processing is not present in the local caches, outputting local cache fill requests for requesting the required data and updating the local caches by the data sent in response to the request.

A second aspect of the present invention is an image processing apparatus where a plurality of modules share processing data for parallel processing, having a plurality of clusters each including a global module and a plurality of local modules, the global module of each cluster having a global cache to which the plurality of local modules are connected in parallel and in which processing data required in the local modules is stored and, when receiving a local cache fill request from a local module, outputting data in the global cache in response to the request to the local module issuing the request, the plurality of local modules have memory modules for storing data concerning images, local caches for storing at least the processing data, and processing units for the charged processing determined by the corresponding memory interleave in advance based on operation parameters and processing data stored in the local caches and, when the processing data required for processing is not present in the local caches, outputting local cache fill requests for requesting the required data and updating the local caches by the data sent in response to the requests, and the global modules of the clusters transfer data with each other.

Further, in the second aspect of the present invention, the plurality of clusters are arrayed in a matrix, and the global modules of the clusters are connected in a ring.

In the first or second aspect of the present invention, when receiving a local cache fill request from a local module, the global module checks entries of the global cache and, when there is an entry, reads out the requested block data and transmits the read out data to the local module transmitting the request.

In the first or second aspect of the present invention, when receiving a global cache fill request, a local module outputs the requested block data to the global module, and, when receiving a local cache fill request from a local module, the global module checks the entries of the global cache and, when there is no entry, sends a global cache fill request to a target local module holding the requested block data, updates the global cache by the block data sent from the target local module after that and reads out the related block data and transmits the read out data to the local module sending the local cache fill request.

In the first or second aspect of the present invention, when receiving a global cache fill request, a local module outputs the requested block data to the global module, and, when receiving a local cache fill request from a local module, the global module checks the entries of the global cache and, when there is an entry, reads out the requested block data and transmits the read out data to the local module transmittting the request, while, when there is no entry, sends a global cache fill request to a target local module holding the requested block data, updates the global cache by the block data sent from the target local module after that and reads out the related block data and transmits the read out data to the local module sending the local cache fill request.

Preferably, the apparatus has a controller for generating the operation parameters, and the global module supplies the operation parameters generated at the controller to the plurality of local modules.

In the first or second aspect of the present invention, the global module has a plurality of channel blocks provided corresponding to the local modules, and the plurality of channel blocks transfer local cache fill requests and data with the corresponding local modules.

Preferably, the plurality of local modules are arranged in the vicinity of the periphery of the global module centered around the global module.

Further, preferably, the plurality of local modules are arranged in the vicinity of the periphery of the global module centered around the global module and in the vicinity of the corresponding channel blocks.

In the first or second aspect of the present invention, the global module has a plurality of channel blocks provided corresponding to the local modules, and the plurality of channel blocks transfer local cache fill requests, global cache fill requests, and data with the corresponding local modules.

Preferably, the parallel processing is parallel processing at the pixel level.

Further, the parallel processing is processing concerning texture.

A third aspect of the present invention is an image processing method where a plurality of modules share processing data for parallel processing, comprising the steps of connecting a plurality of local modules in parallel with respect to a single global module, employing as levels of caches two levels of a global cache shared by a plurality of local modules and local caches locally held by the local modules, having the global module store processing data required at the local modules in the global cache, receive a local cache fill request from a local module, and, at that time, output data in the global cache in response to the request to the local module issuing the request, and having the plurality of local modules store at least the processing data in the local caches, perform charged processing determined by a corresponding memory interleave in advance based on operation parameters and processing data stored in the local caches, and, when the processing data required for the processing in not in the local cache, output local cache fill requests requesting the required data and update the local caches by the data sent in response to the requests.

In the third aspect of the present invention, when the global module receives a local cache fill request from a local module, it checks the entries of the global cache and, when there is an entry, reads out the requested block data and transmits the read out data to the local module transmitting the request.

In the third aspect of the present invention, when a local module receives a global cache fill request, it outputs the requested block data to the global module, and when the global module receives a local cache fill request from a local module, it checks the entries of the global cache and, when there is no entry, sends a global cache fill request to a target local module holding the requested block data, updates the global cache by the block data sent from the target local module after that, reads out the block data, and transmits the read out data to the local module sending the local cache fill request.

In the third aspect of the present invention, when a local module receives a global cache fill request, it outputs the requested block data to the global module, and when the global module receives a local cache fill request from a local module, it checks the entries of the global cache and, when there is an entry, reads out the requested block data and transmits the read out data to the local module transmitting the request, while when there is no entry, sends a global cache fill request to a target local module holding the requested block data, updates the global cache by the block data sent from the target local module after that, reads out the block data, and transmits the read out data to the local module sending the local cache fill request.

According to the present invention, in the case of for example processing of the texture system, the processing parameters are generated at the controller and the generated parameters are broadcasted to the local modules via for example the global module.

Each local module performs for example the following processing in the processing unit.

Namely, when the processing unit receives broadcasted parameters, it decides whether or not the triangle belongs to an area which it is in charge of, for example, an area interleaved in units of 4×4 pixel rectangular areas. When the result is that it belongs to it, various types of data (Z, texture coordinates, colors, etc.) are rasterized.

Next, the MipMap level is calculated by LOD (level of detail) computation, and the (u,v) address is calculated for texture access.

Then, the texture is read out.

In this case, the processing unit of each local module first checks the entries of the local cache at the time of reading the texture.

When the result is that there is an entry, the required texture data is read out.

When the required texture data is not in the local cache, a processing unit transmits a local cache fill request to the global module.

The global module read out any requested block data in the global cache from the corresponding address of the global cache and sends it back through the channel to the local module transmitting the request.

On the other hand, if the requested block data is not in the global cache, it sends a global cache fill request to the local module holding the related block.

The local module receiving the global cache fill request reads out the corresponding block data from the memory and transmits it through a global interface to the global module.

Thereafter, the global module fills the block data in the intended global cache and transmits the data from the intended channel to the local module sending the request.

When the requested block data is sent from the global module, the corresponding local module updates the local cache and reads out the block data by the processing unit.

Next, the local module uses the read out texture data and decimal portions obtained at the time of calculation of the (u,v) address for 4-neighbor interpolation or other filtering.

Next, the module uses the filtered texture data and various rasterized data for processing in units of pixels.

Then, the pixel data passing the various tests in the processing at the pixel level is written into the memory modules, for example, frame buffer and Z-buffer in a built-in DRAM memory.

BRIEF DESCRIPTION OF THE DRAWINGS

FIG. 17A to FIG. 17D are views for explaining addressing concerning an interleave of a bank according to the present embodiment.

BEST MODE FOR WORKING THE INVENTION

Figure 1:
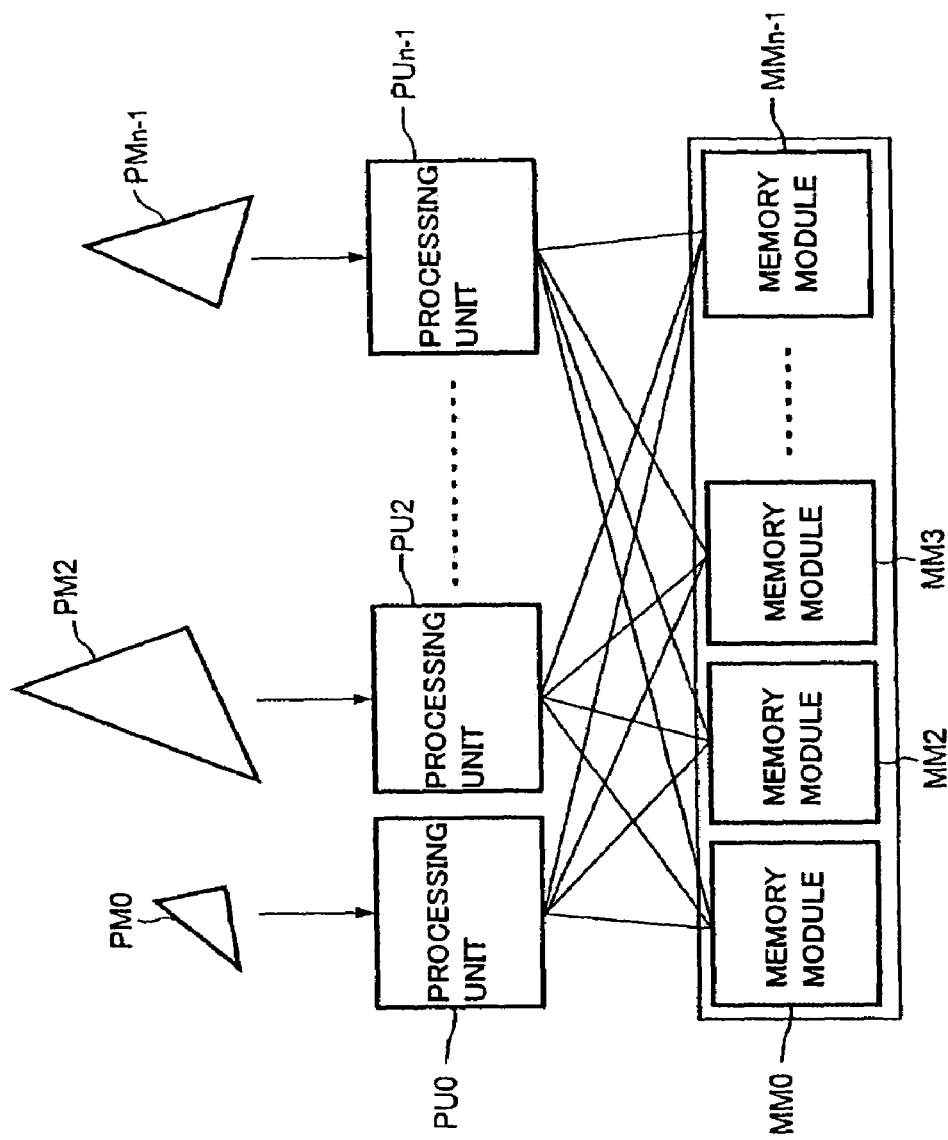
FIG. 1 is a view conceptually showing parallel processing at a primitive level.
Figure 2:
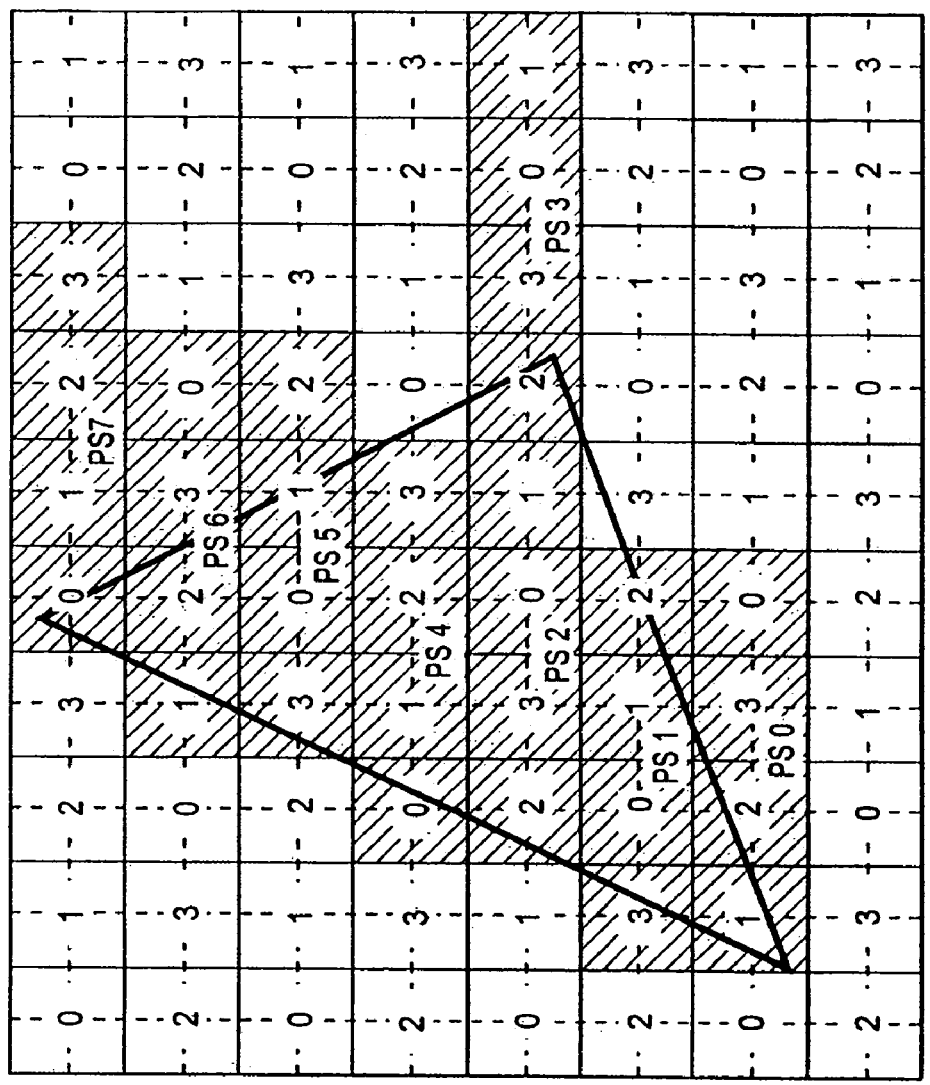
FIG. 2 is a view conceptually showing parallel processing at a primitive level based on a technique of parallel processing at a pixel level.
Figure 3:
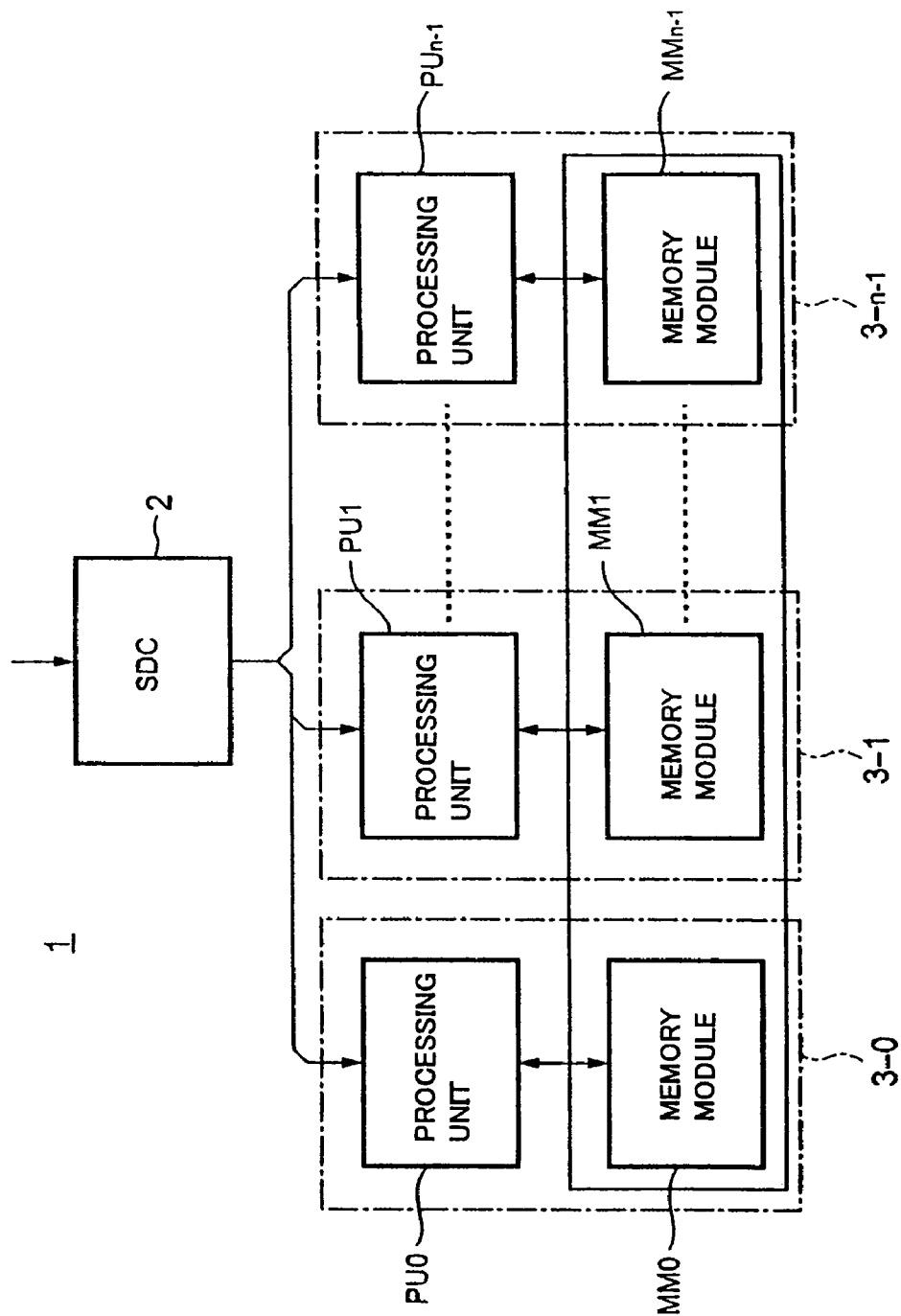
FIG. 3 is a view conceptually showing the configuration of an image processing apparatus employing parallel processing at the pixel level, simultaneously processing a plurality of primitives, and distributing processing to enable processing units and memory modules to be directly connected.
Figure 4:
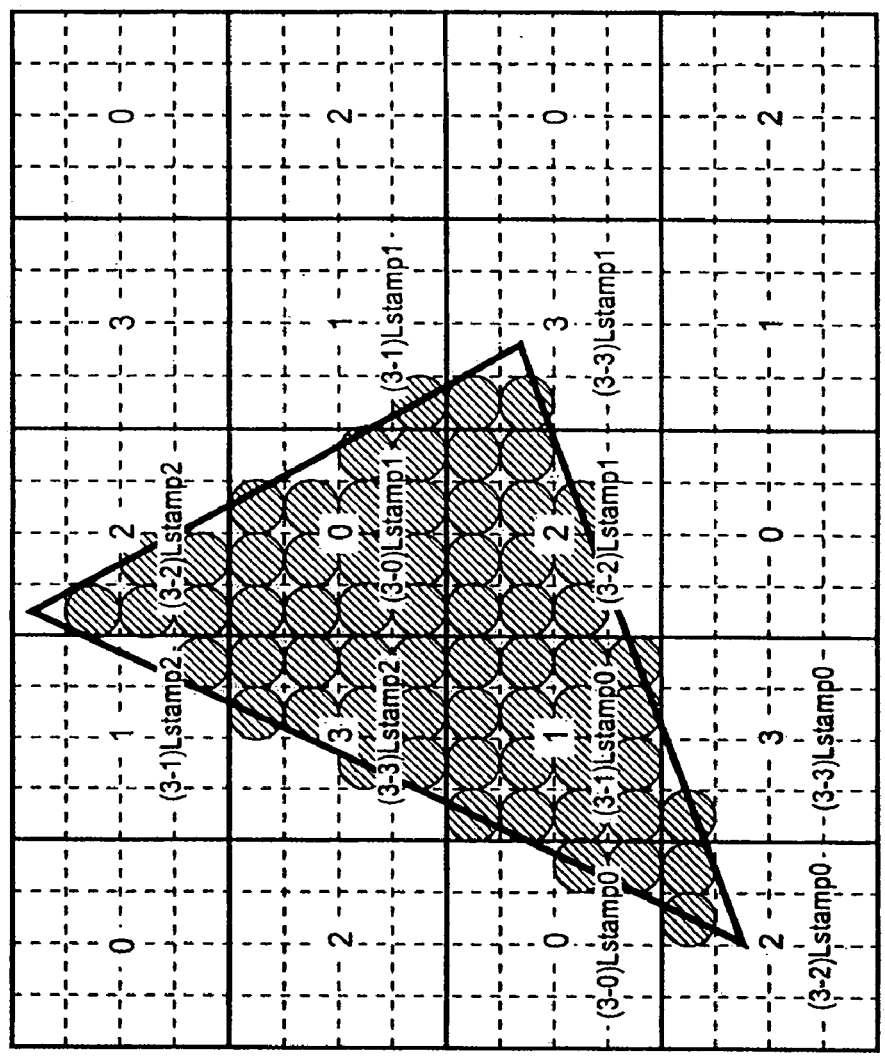
FIG. 4 is a view for explaining pixel generation in the image processing apparatus of FIG. 3.
Figure 5B:
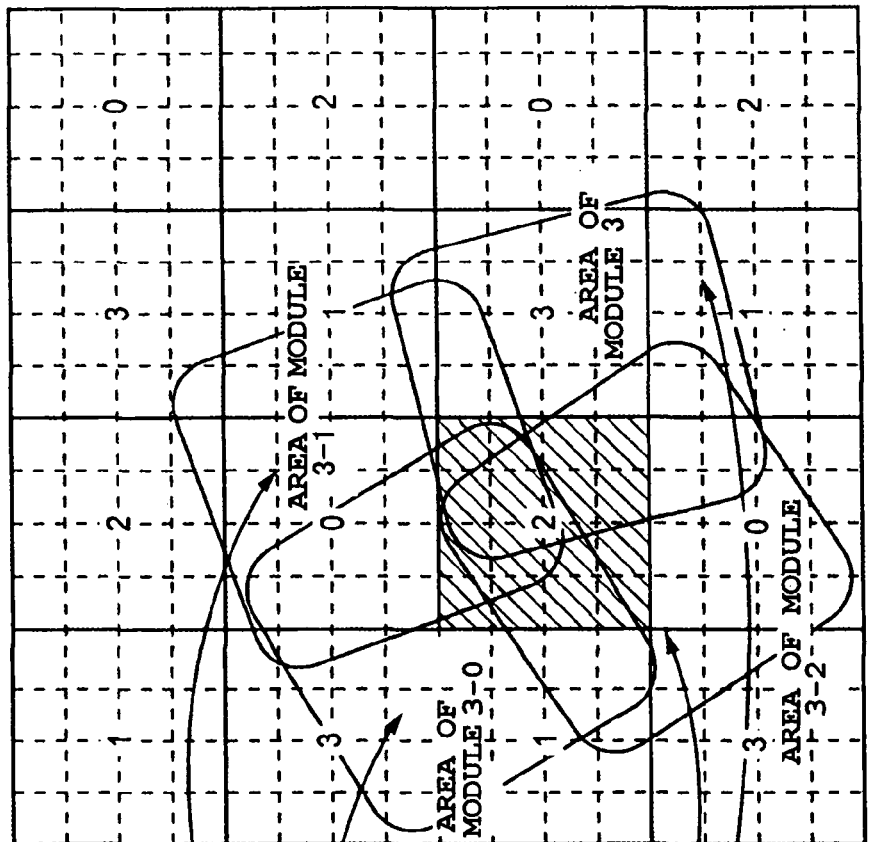
FIG. 5A and FIG. 5B are views conceptually showing a situation of projecting rectangular areas on a screen into a texture space.
Figure 5A:
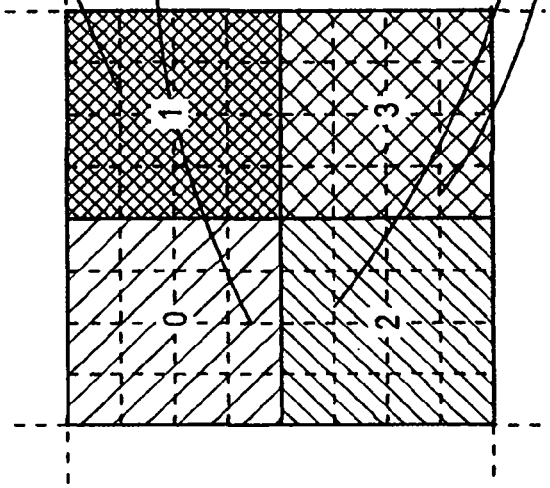
Figure 6:
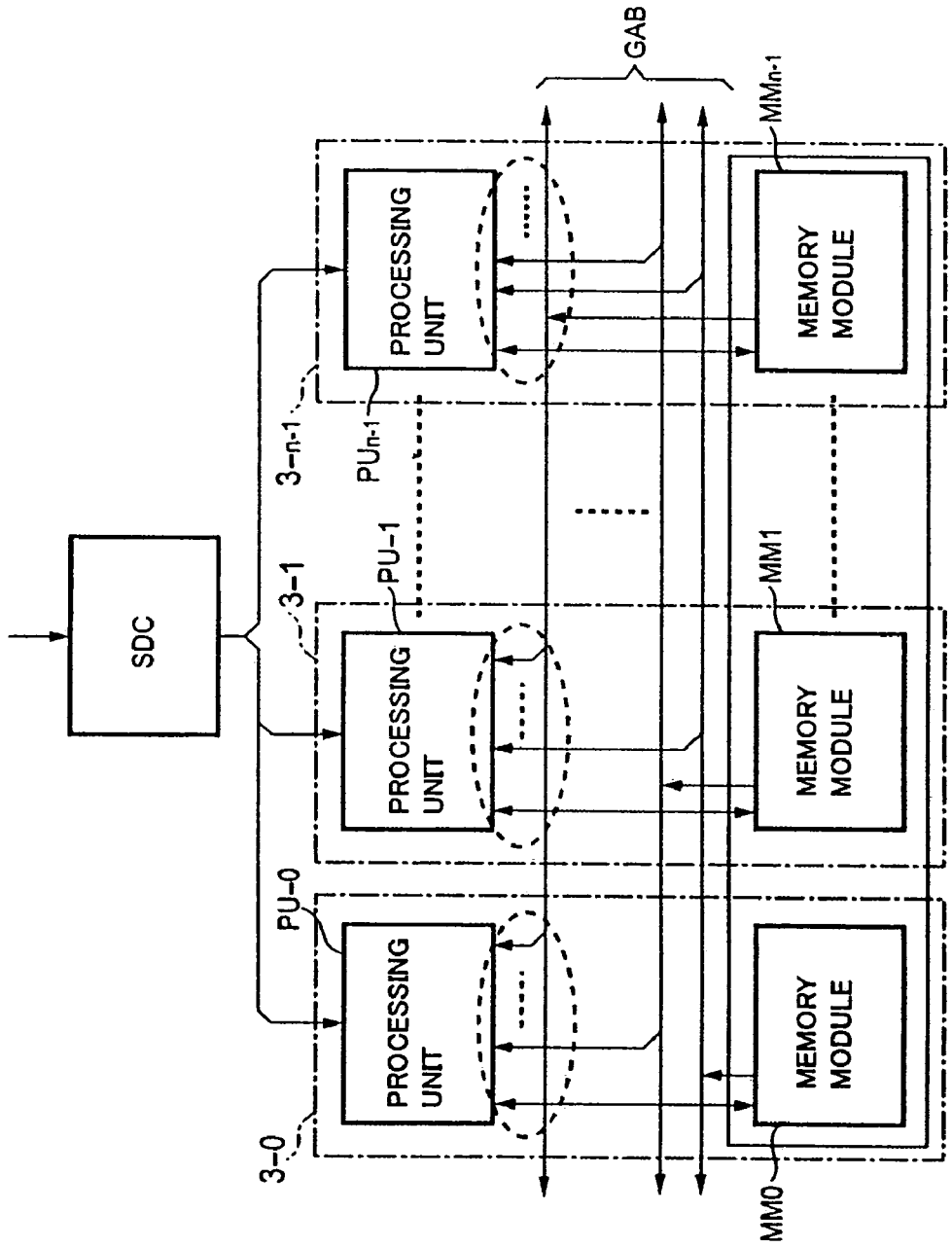
FIG. 6 is a view of an example wherein a crossbar which becomes necessary for memory access of a texture read system is realized in the most direct form in a system for parallel processing by a plurality of processing units.
Figure 7:
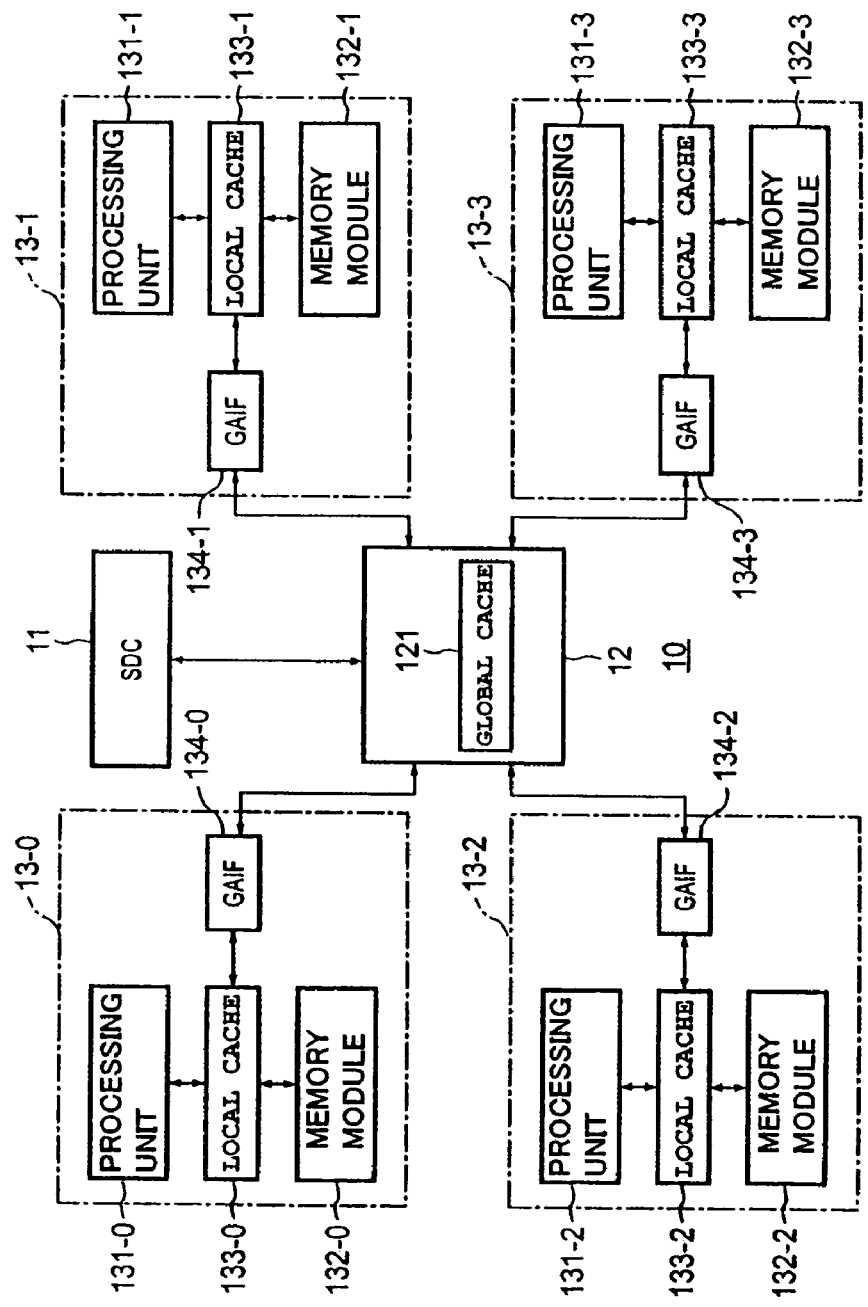
FIG. 7 is a block diagram of the configuration of an embodiment of an image processing apparatus according to the present invention.

FIG. 7 is a block diagram of the configuration of an embodiment of an image processing apparatus according to the present invention.

An image processing apparatus 10 according to the present embodiment has, as shown in FIG. 7, a stream data controller (SDC) 11, a global module 12, and local modules 13-0 to 13-3.

In the present image processing apparatus 10, the SDC11 and the global module 12 transfer data, a plurality of, i.e., four in the present embodiment, local modules 13-0 to 13-3 are connected in parallel to a single global module 12, and a plurality of local modules 13-0 to 13-3 share processing data and process it in parallel.

For the texture read system, memory access with respect to another local module is required, but in place of employing a global access bus, access is performed via one global module 12 having the function of a router.

Further, as will be explained in detail later, the global module 12 has a global cache, and the local modules 13-0 to 13-3 have local caches.

Namely, the present image processing apparatus 10 has as levels of caches two levels of a global cache shared by for example four local modules 13-0 to 13-3 and the local caches locally owned by the local modules.

Below, the configurations and functions of the components will be sequentially explained in relation to the drawings.

The SDC 11 controls the transfer of data with the CPU and the external memory and the transfer of data with the global module 12 and performs processing on the vertex data, generation of parameters required for the rasterization in the processing units of the local modules 13-0 to 13-3, and other processing.

Figure 8:
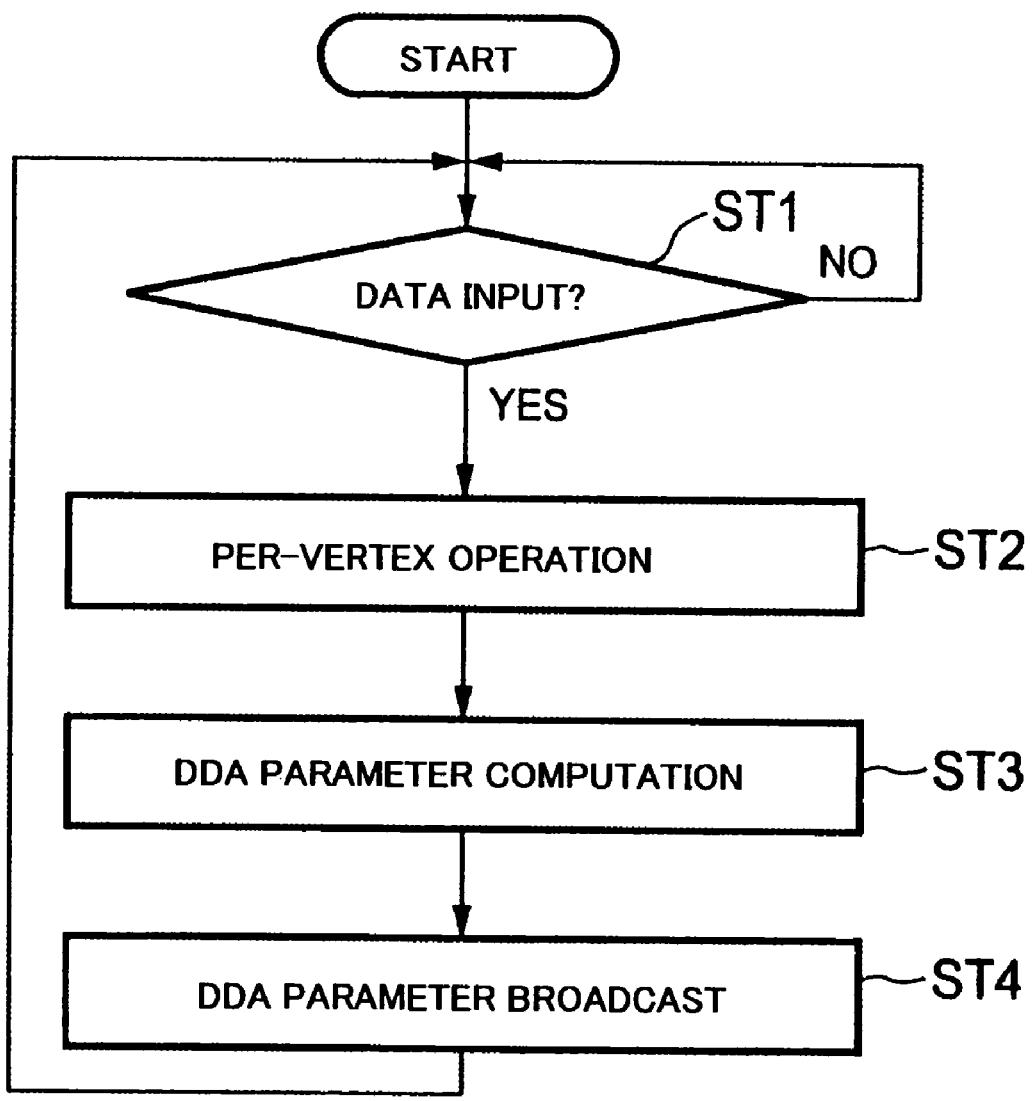
FIG. 8 is a flow chart for explaining main processing of a stream data controller (SDC) according to the present embodiment.

The concrete content of the processing in the SDC 11 is as follows. Further, processing routine of the SDC 11 is shown in FIG. 8.

First, when data is input (ST1), the SDC 11 performs a per-vertex operation (ST2).

In this processing, when vertex data of three-dimensional coordinates, normal vector, and texture coordinates are input, the vertex data is processed. As representative processing, there are processing for coordinate conversion for changing the shape of an object, projecting onto a screen, etc., processing for lighting, and processing for clipping.

The processing carried out here corresponds to the execution of the so-called Vertex Shader.

Next, DDA (digital differential analyzer) parameters are computed (ST3).

This processing calculates the inclinations of various data (Z, texture coordinates, colors, etc.) and other DDA parameters required for the rasterization.

Next, it broadcasts the calculated DDA parameters to all local modules 13-0 to 13-3 via the global module 12 (ST4).

This processing transfers the broadcasted parameters to the local modules 13-0 to 13-3 via the global module 12 by using a channel different from that of the cache fill explained later. However, this does not affect the content of the global cache.

The global module 12 has a router function and a global cache 121 shared by all local modules.

The global module 12 broadcasts the DDA parameters by the SDC 11 to all local modules 13-0 to 13-3 connected in parallel.

Figure 9:
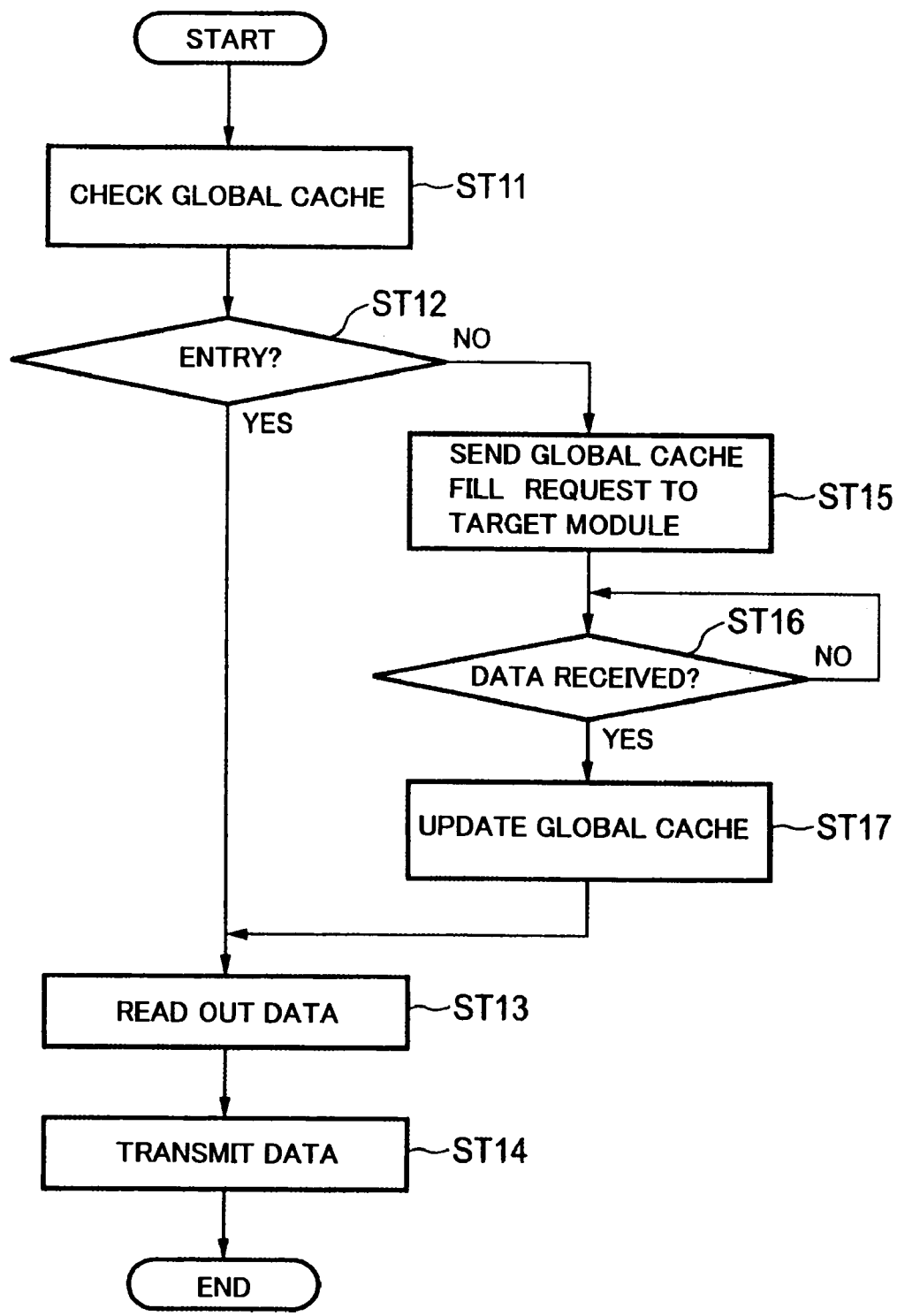
FIG. 9 is a flow chart for explaining functions of a global module according to the present embodiment.

Further, when receiving a local cache fill LCF request from a certain local module, the global module 12 checks the entries of the global cache (ST11) as shown in FIG. 9 and, when there is an entry (ST12), reads out the requested block data (ST13) and transmits the read out data to the local module transmitting the request (ST14), while when there is no entry (ST12), sends a global cache fill GCF request to the target local module holding the block data (ST15), updates the global cache by the block data sent after that (ST16, ST17), reads out the block data (ST13), and transmits the read out data to the local module sending the local cache fill LCF request (ST14).

Figure 10:
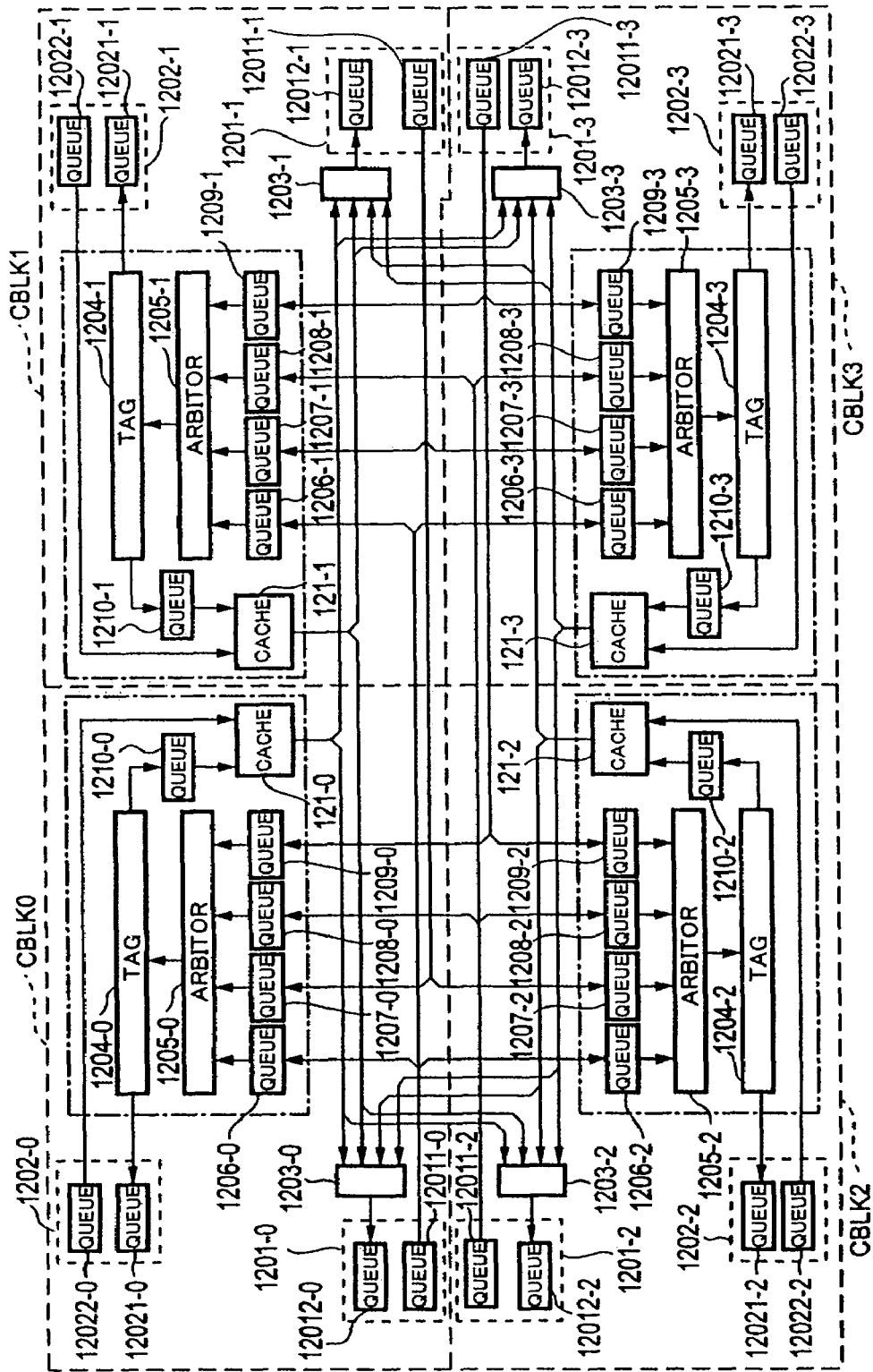
FIG. 10 is a circuit diagram of a concrete example of the configuration of the global module of FIG. 7.

FIG. 10 is a circuit diagram of a concrete example of the configuration of the global module of FIG. 7.

The global module 12 has a channel block CBLK0 for mainly transferring data with the local module 13-0, a channel block CBLK1 for mainly transferring data with the local module 13-1, a channel block CBLK2 for mainly transferring data with the local module 13-2, and a channel block CBLK3 for mainly transferring data with the local module 13-3.

Further, in the present embodiment, global caches 121-0 to 121-3 each having a predetermined capacity are arranged in the channel blocks CBLK0 to CBLK3.

The channel block CBLK0 has, in addition to the global cache 121-0, a local cache fill channel 1201-0, global cache fill channel 1202-0, selector 1203-0, tag circuit 1204-0, arbitor 1205-0, and queue registers 1206-2 to 1210-0 configured by for example FIFO (First-In First-Out) queues.

Similarly, the channel block CBLK1 has, in addition to the global cache 121-1, a local cache fill channel 1201-1, global cache fill channel 1202-1, selector 1203-1, tag circuit 1204-1, arbitor 1205-1, and queue registers 1206-1 to 1210-1.

The channel block CBLK2 has, in addition to the global cache 121-2, a local cache fill channel 1201-2, global cache fill channel 1202-2, selector 1203-2, tag circuit 1204-2, arbitor 1205-2, and queue registers 1206-2 to 1210-2.

The channel block CBLK3 has, in addition to the global cache 121-3, a local cache fill channel 1201-3, global cache fill channel 1202-3, selector 1203-3, tag circuit 1204-3, arbitor 1205-3, and queue registers 1206-3 to 1210-3.

The local cache fill channel 1201-0 in the channel block CBLK0 has a request queue register 12011-0 and data queue register 12012-0.

The request queue register 12011-0 receives as input the local cache fill LCF request transferred from the local module 13-0 and outputs the same to the queue register 1206-0 and queue register 1206-1 of the channel block CBLK1, the queue register 1206-2 of the channel block CBLK2, and the queue register 1206-3 of the channel block CBLK3.

The data queue register 12012-0 receives as input the block data read out from the global cache 121-0, 121-1, 121-2, or 121-3 and selected at the selector 1203-0 and outputs the same to the local module 13-0.

The global cache fill channel 1202-0 in the channel block CBLK0 has a request queue register 12021-0 and data queue register 12022-0.

The request queue register 12021-0 receives the global cache fill GCF request from the tag circuit 1204-0 and outputs the same to the target local module 13-0 holding the requested block data.

The data queue register 12022-0 receives the block data transferred from the target local module 13-0 receiving the global cache fill request and supplies the same to the global cache 121-0.

The selector 1203-0 in the channel block CBLK0 selects the block data read out from the global cache 121-0, 121-1, 121-2, or 121-3 in accordance with an instruction of a not illustrated control system and supplies the same to the data queue register 12012-0 of the local cache fill channel 1201-0.

The tag circuit 1204-0 in the channel block CBLK0 has a memory for storing the address tags of the block data stored in the global cache 121-0, compares the address of the block data requested by a request selected by the arbitor 1205-0 from among local cache fill requests from the local modules 13-0 to 13-3 via the channel blocks CBLK0 to CBLK3 held in the queue registers 1206-0 to 1209-0 with the address tags stored in the tag circuit 1204-0, and, if there is a match, reads out the data of the global cache 121-0 corresponding to the related address tag and supplies it to the selectors 1203-0 to 1203-3 of the channel blocks CBLK0 to CBLK3.

At this time, it is instructed by a not illustrated control system instructs to select the data read out from the global cache 121-0 of the channel block CBLK0 at the selector of the channel block for transferring the data with the local module sending the local cache fill request.

On the other hand, when it is learned that block data requested from any of the local modules 13-0 to 13-3 is not stored in the global cache 121-0, the tag circuit 1204-0 sets flags indicating at which addresses of the global cache 121-0 there is data, sets the addresses in the queue register 1210-0, and supplies a global cache fill request to the request queue register 12021-0 of the global cache channel 1202-0. When the requested data is sent from the local module 13-0 to the queue register 12022-0 for the global cache channel 1202-0, the global cache 121-0 updates the content of the global cache 121-0 by the data based on the addresses set in the queue register 1210-0 and supplies the data requested by the local cache fill request to the selectors 1203-0 to 1203-3 of the channel blocks CBLK0 to CBLK3.

The arbitor 1205-0 of the channel block CBLK0 performs arbitration work by receiving local cache fill requests from the local modules 13-0 to 13-3 via the channel blocks CBLK0 to CBLK3 held in the queue registers 1206-0 to 1209-0, selects a request in accordance with the number of the block data which can be simultaneously read out from the global cache 121-0, and outputs the same to the tag circuit 1204-0.

The queue register 1206-0 of the channel block CBLK0 holds the request decided to be stored in the memory module of the local module 13-0 among the local cache fill requests from the local module 13-0 via the channel 1201-0.

The queue register 1207-0 holds the request decided to be stored in the memory module of the local module 13-0 among local cache fill requests from the local module 13-1 via the channel 1201-1 of the channel block CBLK1.

The queue register 1208-0 holds the request decided to be stored in the memory module of the local module 13-0 among local cache fill requests from the local module 13-2 via the channel 1201-2 of the channel block CBLK2.

The queue register 1209-0 holds the request decided to be stored in the memory module of the local module 13-0 among local cache fill requests from the local module 13-3 via the channel 1201-3 of the channel block CBLK3.

The local cache fill channel 1201-1 in the channel block CBLK1 has a request queue register 12011-1 and a data queue register 12012-1.

The request queue register 12011-1 receives as input the local cache fill LCF request transferred from the local module 13-1 and outputs the same to the queue register 1207-1 and the queue register 1207-0 of the channel block CBLK0, the queue register 1207-2 of the channel block CBLK2, and the queue register 1207-3 of the channel block CBLK3.

The data queue register 12012-1 receives as input the block data read out from the global cache 121-0, 121-1, 121-2, or 121-3 and selected at the selector 1203-1 and outputs the same to the local module 13-1.

The global cache fill channel 1202-1 in the channel block CBLK1 has a request queue register 12021-1 and a data queue register 12022-1.

The request queue register 12021-1 receives the global cache fill GCF request from the tag circuit 1204-1 and outputs the same to the targete local module 13-1 holding the requested block data.

The data queue register 12022-1 receives the block data transferred from the target local module 13-1 receiving the global cache fill request and supplies the same to the global cache 121-1.

The selector 1203-1 in the channel block CBLK1 selects the block data read out from the global cache 121-0, 121-1, 121-2, or 121-3 in accordance with an instruction of a not illustrated control system and supplies the same to the data queue register 12012-1 of the local cache fill channel 1201-1.

The tag circuit 1204-1 in the channel block CBLK1 has a memory for storing the address tag of the block data stored in the global cache 121-1, compares the address of the block data requested by the request selected by the arbitor 1205-1 from among local cache fill requests from the local modules 13-0 to 13-3 via the channel blocks CBLK0 to CBLK3 held in the queue registers 1206-1 to 1209-1 with the address tag stored in the tag circuit 1204-1, and, if there is a match, reads out the data of the global cache 121-1 corresponding to the related address tag and supplies it to the selectors 1203-0 to 1203-3 of the channel blocks CBLK0 to CBLK3.

At this time, it is instructed by a not illustrated control system to select the data read out from the global cache 121-1 of the channel block CBLK1 at the selector of the channel block for transferring data with the local module sending the local cache fill request.

On the other hand, when it is learned that the block data requested from any of the local modules 13-0 to 13-3 is not stored in the global cache 121-1, the tag circuit 1204-1 sets flags indicating at which addresses of the global cache 121-1 there is data, sets the addresses in the queue register 1210-1, and supplies a global cache fill request to the request queue register 12021-1 of the global cache channel 1202-1. When the requested data is sent from the local module 13-0 to the queue register 12022-1 for the global cache channel 1202-1, the global cache 121-1 updates the content of the global cache 121-1 by the data based on the addresses set in the queue register 1210-1 and supplies the data requested by the local cache fill request to the selectors 1203-0 to 1203-3 of the channel blocks CBLK0 to CBLK3.

The arbitor 1205-1 of the channel block CBLK1 performs arbitration work by receiving the local cache fill requests from the local modules 13-0 to 13-3 via the channel blocks CBLK0 to CBLK3 held in the queue registers 1206-1 to 1209-1, selects a request in accordance with the number of the block data which can be simultaneously read out from the global cache 121-1, and outputs the same to the tag circuit 1204-1.

The queue register 1206-1 of the channel block CBLK1 holds the request decided to be stored in the memory module of the local module 13-1 among the local cache fill requests from the local module 13-0 via the channel 1201-0 of the channel block CBLK0.

The queue register 1207-1 holds the request decided to be stored in the memory module of the local module 13-1 among the local cache fill requests from the local module 13-1 via the channel 1201-1 of the channel block CBLK1.

The queue register 1208-1 holds the request decided to be stored in the memory module of the local module 13-1 among the local cache fill requests from the local module 13-2 via the channel 1201-2 of the channel block CBLK2.

The queue register 1209-1 holds the request decided to be stored in the memory module of the local module 13-1 among the local cache fill requests from the local module 13-3 via the channel 1201-3 of the channel block CBLK3.

The local cache fill channel 1201-2 in the channel block CBLK2 has a request queue register 12011-2 and a data queue register 12012-2.

The request queue register 12011-2 receives as input the local cache fill LCF request transferred from the local module 13-2 and outputs the same to the queue register 1208-2 and the queue register 1208-0 of the channel block CBLK0, the queue register 1208-1 of the channel block CBLK1, and the queue register 1208-3 of the channel block CBLK3.

The data queue register 12012-2 receives as input the block data read out from the global cache 121-0, 121-1, 121-2, or 121-3 and selected at the selector 1203-2 and outputs the same to the local module 13-2.

The global cache fill channel 1202-2 in the channel block CBLK2 has a request queue register 12021-2 and a data queue register 12022-2.

The request queue register 12021-2 receives the global cache fill GCF request from the tag circuit 1204-2 and outputs the same to the target local module 13-2 holding the requested block data.

The data queue register 12022-2 receives the block data transferred from the target local module 13-2 receiving the global cache fill request and supplies the same to the global cache 121-2.

The selector 1203-2 in the channel block CBLK2 selects the block data read out from the global cache 121-0, 121-1, 121-2, or 121-3 in accordance with an instruction of the not illustrated control system and supplies the same to the data queue register 12012-2 of the local cache fill channel 1201-2.

The tag circuit 1204-2 in the channel block CBLK2 has a memory for storing the address tag of the block data stored in the global cache 121-2, compares the address of the block data requested by the request selected by the arbitor 1205-2 from among local cache fill requests from the local modules 13-0 to 13-3 via the channel blocks CBLK0 to CBLK3 held in the queue registers 1206-2 to 1209-2 with the address tag stored in the tag circuit 1204-2, and, if there is a match, reads out the data of the global cache 121-2 corresponding to the related address tag and supplies it to the selectors 1203-0 to 1203-3 of the channel blocks CBLK0 to CBLK3.

At this time, it is instructed by the not illustrated control system to select the data read out from the global cache 121-2 of the channel block CBLK2 at the selector of the channel block for transferring the data with the local module sending the local cache fill request.

On the other hand, when it is learned that the block data requested from any of the local modules 13-0 to 13-3 is not stored in the global cache 121-2, the tag circuit 1204-2 sets flags indicating at which addresses of the global cache 121-2 there is data, sets the addresses in the queue register 1210-2, and supplies a global cache fill request to the request queue register 12021-2 of the global cache channel 1202-2. When the requested data is sent from the local module 13-0 to the queue register 12022-2 for the global cache channel 1202-2, the global cache 121-2 updates the content of the global cache 121-2 by the data based on the addresses set in the queue register 1210-2 and supplies the data requested by the local cache fill request to the selectors 1203-0 to 1203-3 of the channel blocks CBLK0 to CBLK3.

The arbitor 1205-2 of the channel block CBLK2 performs arbitration work by receiving the local cache fill requests from the local modules 13-0 to 13-3 via the channel blocks CBLK0 to CBLK3 held in the queue registers 1206-2 to 1209-2, selects a request in accordance with the number of the block data which can be simultaneously read out from the global cache 121-2, and outputs the same to the tag circuit 1204-2.

The queue register 1206-2 of the channel block CBLK2 holds the request decided to be stored in the memory module of the local module 13-0 among local cache fill requests by the local module 13-0 via the channel 1201-0 of the channel block CBLK0.

The queue register 1207-2 holds the request decided to be stored in the memory module of the local module 13-2 among the local cache fill requests from the local module 13-1 via the channel 1201-1 of the channel block CBLK1.

The queue register 1208-2 holds the request decided to be stored in the memory module of the local module 13-2 among the local cache fill requests from the local module 13-2 via the channel 1201-2 of the channel block CBLK2.

The queue register 1209-2 holds the request decided to be stored in the memory module of the local module 13-2 among the local cache fill requests from the local module 13-3 via the channel 1201-3 of the channel block CBLK3.

The local cache fill channel 1201-3 in the channel block CBLK3 has a request queue register 12011-3 and a data queue register 12012-3.

The request queue register 12011-3 receives as input the local cache fill LCF request transferred from the local module 13-3 and outputs the same to the queue register 1209-3 and the queue register 1209-0 of the channel block CBLK0, the queue register 1209-1 of the channel block CBLK1, and the queue register 1209-2 of the channel block CBLK2.

The data queue register 12012-3 receives as input the block data read out from the global cache 121-0, 121-1, 121-2, or 121-3 and selected at the selector 1203-3 and outputs the same to the local module 13-3.

The global cache fill channel 1202-3 in the channel block CBLK3 has a request queue register 12021-3 and a data queue register 12022-3.

The request queue register 12021-3 receives the global cache fill GCF request from the tag circuit 1204-3 and outputs the same to the target local module 13-3 holding the requested block data.

The data queue register 12022-3 receives the block data transferred from the target local module 13-3 receiving the global cache fill request and supplies the same to the global cache 121-3.

The selector 1203-3 in the channel block CBLK3 selects the block data read out from the global cache 121-0, 121-1, 121-2, or 121-3 in accordance with an instruction of a not illustrated control system and supplies the same to the data queue register 12012-3 of the local cache fill channel 1201-3.

The tag circuit 1204-3 in the channel block CBLK3 has a memory for storing the address tag of the block data stored in the global cache 121-3, compares the address of the block data requested by the request selected by the arbitor 1205-3 from among local cache fill requests from the local modules 13-0 to 13-3 via the channel blocks CBLK0 to CBLK3 held in the queue registers 1206-3 to 1209-3 with the address tag stored in the tag circuit 1204-3, and, if there is a match, reads out the data of the global cache 121-3 corresponding to the related address tag and supplies it to the selectors 1203-0 to 1203-3 of the channel blocks CBLK0 to CBLK3.

At this time, it is instructed by a not illustrated control system to select the data read out from the global cache 121-3 of the channel block CBLK3 at the selector of the channel block for transferring the data with the local module sending the local cache fill request.

On the other hand, when it is learned that the block data requested from any of the local modules 13-0 to 13-3 is not stored in the global cache 121-3, the tag circuit 1204-3 sets flags indicating at which addresses of the global cache 121-3 there is data, sets the addresses in the queue register 1210-3, and supplies the global cache fill request to the request queue register 12021-3 of the global cache channel 1202-3. When the requested data is sent from the local module 13-0 to the queue register 12022-3 for the global cache channel 1202-3, the global cache 121-3 updates the content of the global cache 121-3 by the related data based on the addresses set in the queue register 1210-3 and supplies the data requested by the local cache fill request to the selectors 1203-0 to 1203-3 of the channel blocks CBLK0 to CBLK3.

The arbitor 1205-3 of the channel block CBLK3 performs arbitration work by receiving the local cache fill requests from the local modules 13-0 to 13-3 via the channel blocks CBLK0 to CBLK3 held in the queue registers 1206-3 to 1209-3, selects a request in accordance with the number of the block data which can be simultaneously read out from the global cache 121-3, and outputs the same to the tag circuit 1204-3.

The queue register 1206-3 of the channel block CBLK3 holds the request decided to be stored in the memory module of the local module 13-3 among the local cache fill requests from the local module 13-0 via the channel 1201-0 of the channel block CBLK0.

The queue register 1207-3 holds the request decided to be stored in the memory module of the local module 13-3 among the local cache fill requests from the local module 13-1 via the channel 1201-1 of the channel block CBLK1.

The queue register 1208-3 holds the request decided to be stored in the memory module of the local module 13-3 among the local cache fill requests from the local module 13-2 via the channel 1201-2 of the channel block CBLK2.

The queue register 1209-3 holds the request decided to be stored in the memory module of the local module 13-3 among the local cache fill requests from the local module 13-3 via the channel 1201-3 of the channel block CBLK3.

Note that the configuration of FIG. 10 is an example. In place of the configuration of arranging the global cache 121 for every channel block, various aspects are possible, for example, providing a single cache and accessing it from each channel block.

The local module 13-0 has a processing unit 131-0, a memory module 132-0 configured by for example a DRARM, a local cache 133-0 inherent in the module, and a global interface (GAIF) 134-0 interfacing with the channel block CBLK0 of the global module 12.

Similarly, the local module 13-1 has a processing unit 131-1, a memory module 132-1 configured by for example a DRARM, a local cache 133-1 inherent in the module, and a global interface (GAIF) 134-1 interfacing with the channel block CBLK1 of the global module 12.

The local module 13-2 has a processing unit 131-2, a memory module 132-2 configured by for example a DRARM, a local cache 133-2 inherent in the module, and a global interface (GAIF) 134-2 interfacing with the channel block CBLK2 of the global module 12.

The local module 13-3 has a processing unit 131-3, a memory module 132-3 configured by for example a DRARM, a local cache 133-3 inherent in the module, and a global interface (GAIF) 134-3 interfacing with the channel block CBLK3 of the global module 12.

The local modules 13-0 to 13-3 have the memory modules 132-0 to 132-3 interleaved in predetermined sizes, for example, 4×4 rectangular area units. The memory module 132-0 and the processing unit 131-0, the memory module 132-1 and the processing unit 131-1, the memory module 132-2 and the processing unit 131-2, and the memory module 132-3 and the processing unit 131-3 have areas in charge in a one-to-one correspondence. There is no memory access to other local modules for the drawing system.

On the other hand, the local modules 13-0 to 13-3 require memory access to other local modules for the texture read system, but in this case access is via the global module 12.

Figure 11:
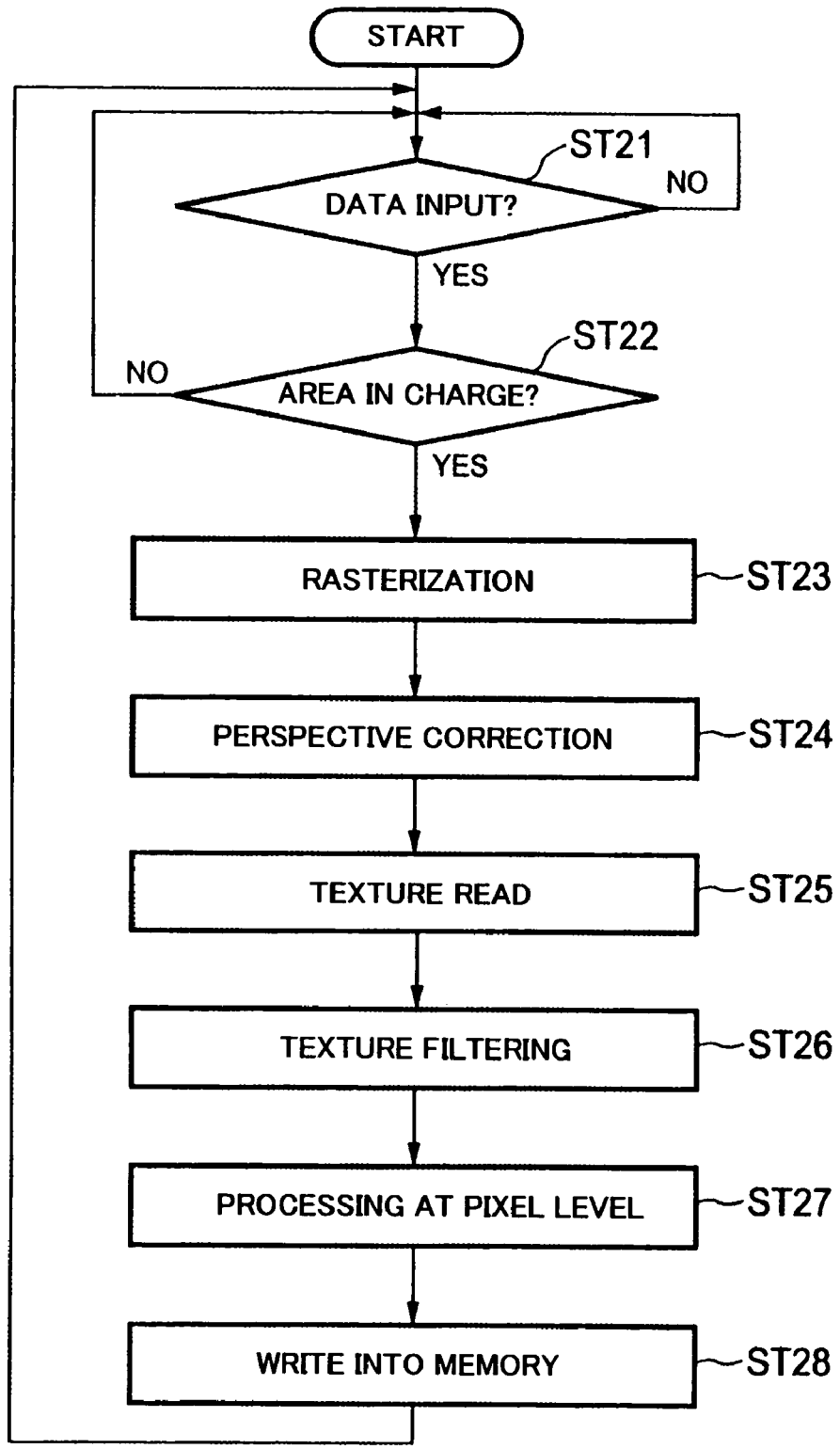
FIG. 11 is a view for explaining main processing of a processing unit in a local module according to the present embodiment.
Figure 12:
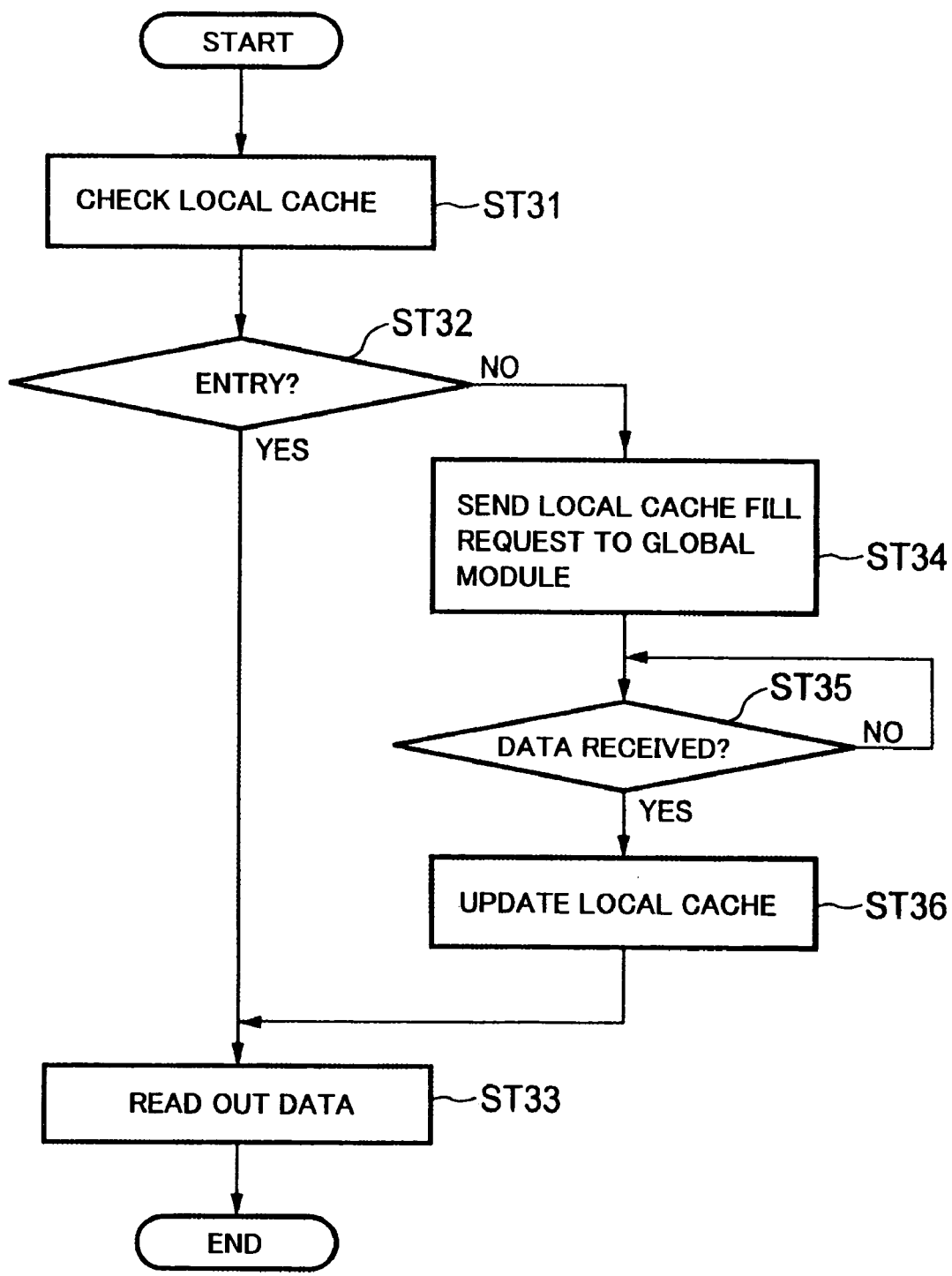
FIG. 12 is a flow chart for explaining an operation of a local module at the time of reading texture according to the present embodiment.

The processing units 131-0 to 131-3 of the local modules 13-0 to 13-3 perform the following processing. Further, the processing routines of the processing units 131-0 to 131-3 are shown in FIG. 11.

When receiving as input a broadcasted parameter data (ST21), the processing unit 131 decides whether or not the triangle is an area which it is in charge of (ST22). If an area it is in charge of, it performs rasterization (ST23).

Namely, when receiving a broadcasted parameter, it decides whether or not the triangle belongs to the area it is in charge of, for example, an area interleaved in 4×4 pixel rectangular area units. If belonging to it, it rasterizes various data (Z, texture coordinates, colors, etc.). In this case, the generated unit is 2×2 pixels in one cycle per one local module.

Next, perspective correction of the texture coordinates is carried out (ST24). Further, this processing stage also includes calculation at the MipMap level by LOD (Level of Detail) computation and (u, v) address computation for the texture access.

Next, texture reading is carried out (ST25).

In this case, the processing units 131-0 to 131-3 of the local modules 13-0 to 13-3 first check the entries of the local caches 133-0 to 133-3 at the time of reading the texture (ST31) and when there is an entry (ST32), reads out the required texture data (ST33).

When the required texture data is not in the local caches 133-0 to 133-3, the processing units 131-0 to 131-3 send local cache fill requests to the global module 12 through the global interfaces 134-0 to 134-3 (ST34).

Then, the global module 12 returns the requested blocks to local modules sending the requests, but if not there, as mentioned above (explained in relation to FIG. 9), sends a global cache fill request to the local module holding the related block. Thereafter, it fills the block data in the global cache and transmits the data to the local module sending the request.

When the requested block data is sent from the global module 12, the corresponding local module updates the local cache (ST35, ST36), and the processing unit reads out the block data (ST33).

Note that, here, simultaneous processings of four textures at the maximum are assumed. The number of the texture data to be read out is 16 texels per pixel.

Next, texture filtering is carried out (ST26).

In this case, the processing units 133-0 to 133-3 perform filtering such as four-neighbor interpolation by using the read out texture data and the decimal portion obtained at the time of calculation of the (u, v) address.

Next, it performs processing of the pixel level (Per-Pixel Operation) (ST27).

In this processing, operation in pixel units is carried out by using the texture data after filtering and various data after rasterization. The processing carried out here corresponds to lighting at the pixel level (Per-Pixel Lighting) or other so-called "Pixel Shader". In addition, te following processing is included:

That is, the processing of an alpha test, scissoring, Z-buffer test, stencil test, alpha blending, logical operation, and dithering.

Then, the pixel data passing the various tests in the processing at the pixel level is written into the memory modules 132-0 to 132-3, for example, the frame buffer and Z-buffer on the built-in DRAM memory (ST28: Memory Write).

The local caches 133-0 to 133-3 of the local modules 13-0 to 13-3 store the drawing data and texture data required for the processings of the processing units 131-0 to 131-3 and perform the transfer of data with the processing units 131-0 to 131-3 and the transfer of data with the memory modules 132-0 to 132-3 (Write, Read).

Figure 13:
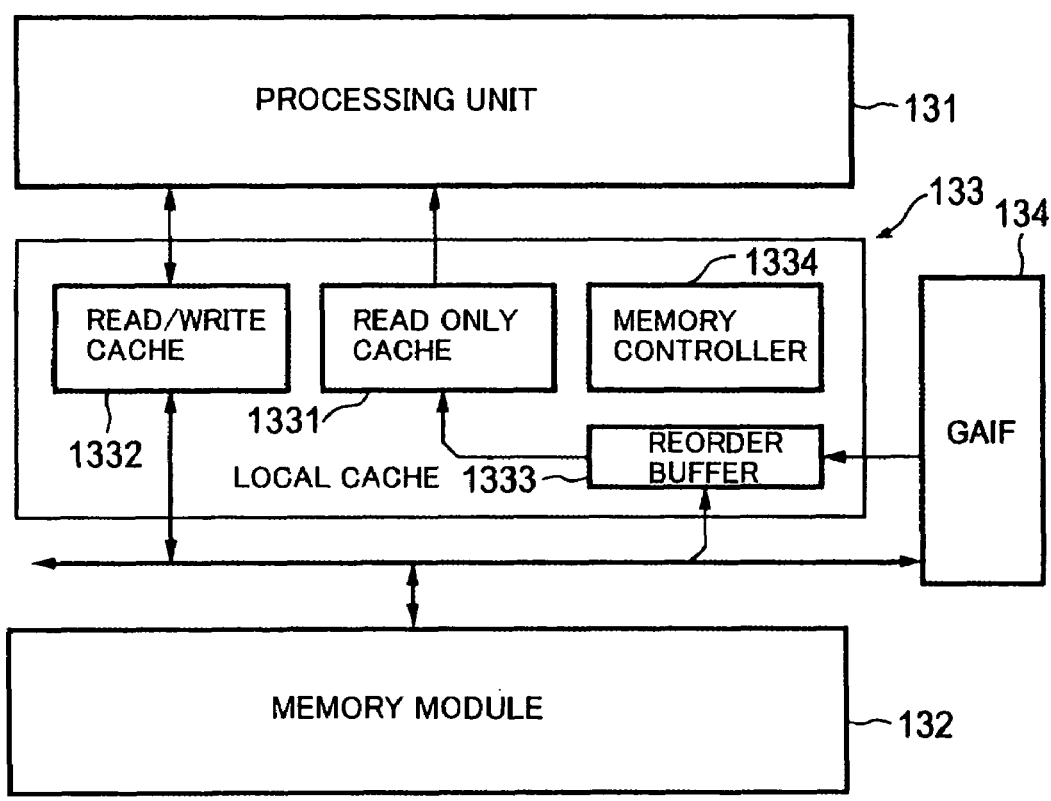
FIG. 13 is a block diagram of an example of the configuration of a local cache in a local module according to the present embodiment.

FIG. 13 is a block diagram of an example of the configuration of the local caches 133-0 to 133-3 of the local modules 13-0 to 13-3.

The local cache 133 includes, as shown in FIG. 13, a read only cache 1331, a read write cache 1332, a reorder buffer 1333, and a memory controller 1334.

The read only cache 1331 is used for the storage of the texture system data, while the read write cache 1332 is used for the storage of the drawing system data.

Figure 14:
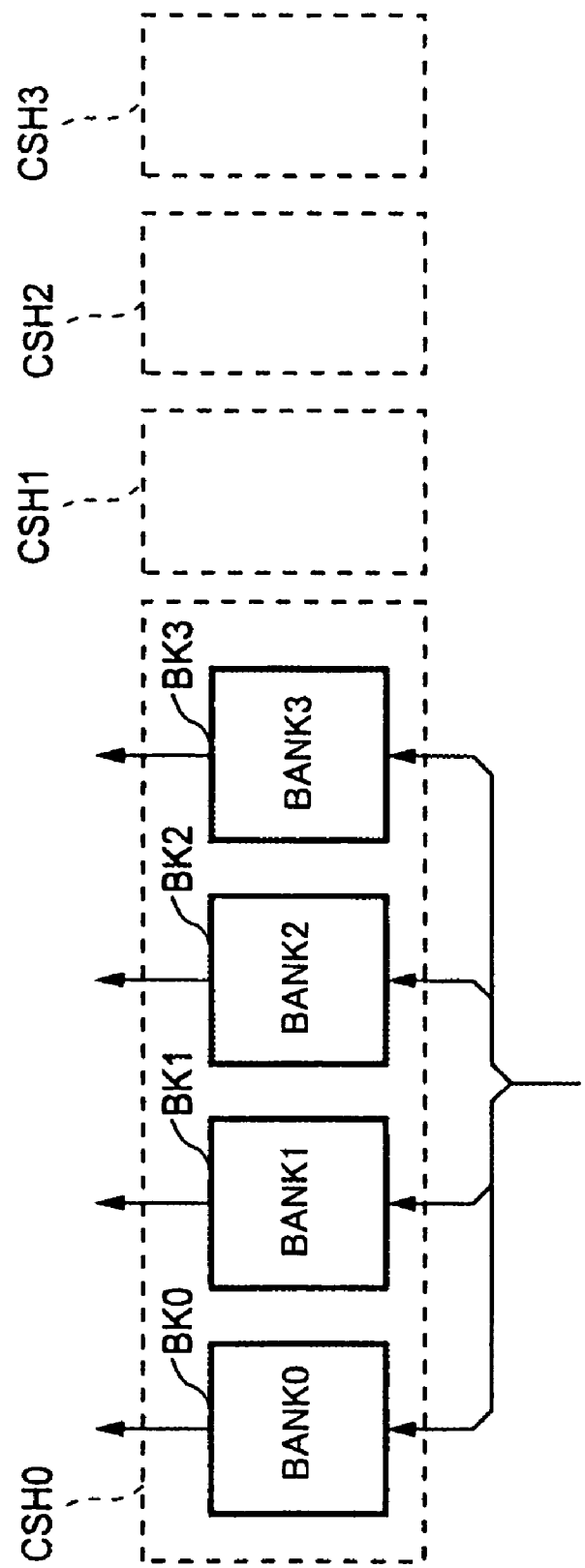
FIG. 14 is a block diagram of an example of the configuration of a read only cache of a local cache according to the present embodiment.

Further, FIG. 14 is a view of an example of the configuration of the read only cache 1331 used in the texture system.

As shown in FIG. 14, this read only cache 1331 processes four textures by one local module, so is provided with four caches CSH0 to CSH3 corresponding to this.

Further, the caches CSH0 to CSH3 are provided with four memory banks BK0 to BK3 since four strings of data are required for every pixel so as to perform four neighbor interpolation or other filtering.

The reorder buffer 1333 is a so-called waiting buffer. When local cache fill requests are issued whyen the required data of the local cache is not there, sometimes the order of the data sent by the global module 12 is different, therefore, the reorder buffer 1333 observes this order and adjusts the order of the data so as to return it to the order of the requests to the processing units 131-0 to 131-3.

Figure 15:
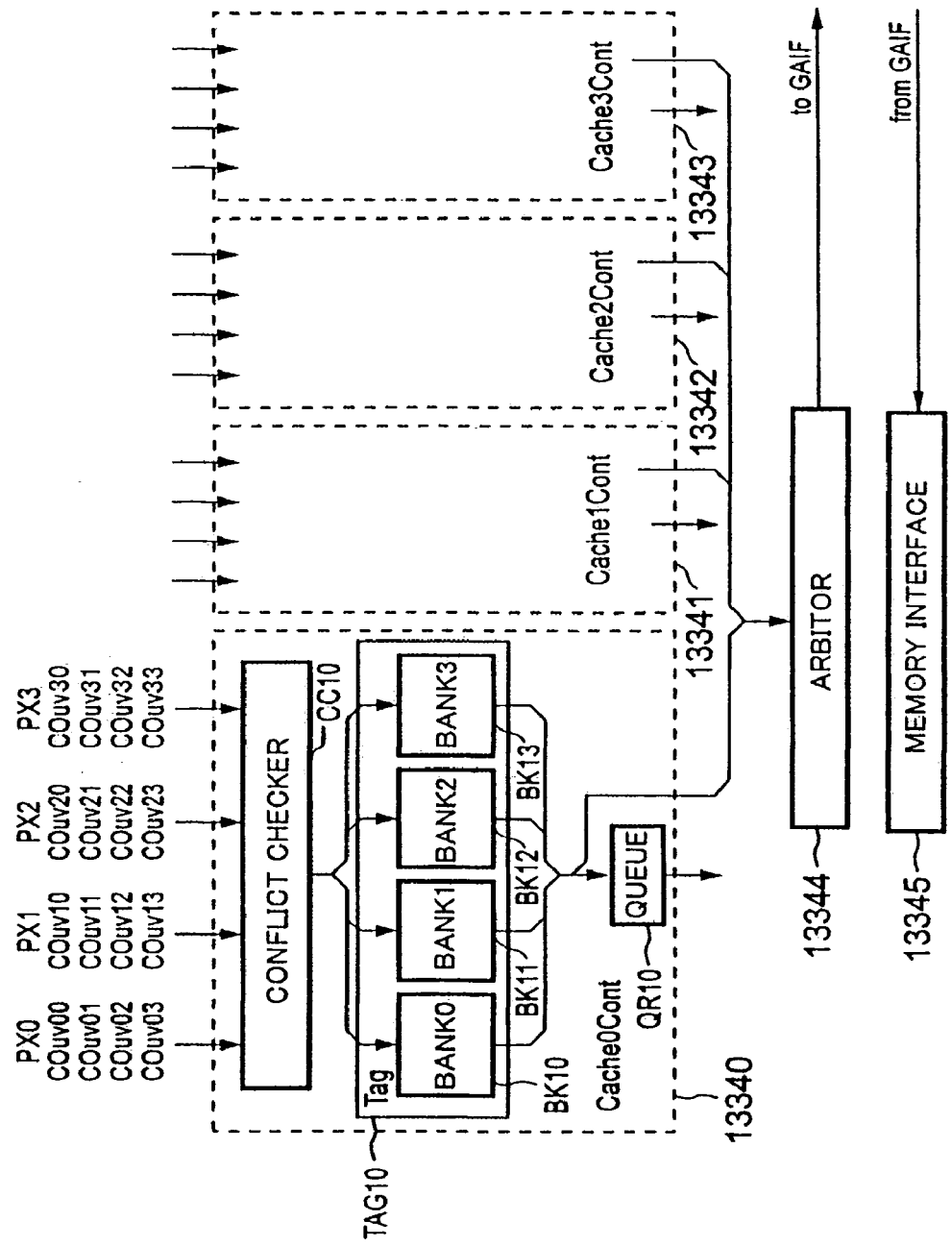
FIG. 15 is a block diagram of an example of the configuration of a memory controller of a local cache according to the present embodiment.

Further, FIG. 15 is a block diagram of an example of the configuration of the texture system of the memory controller 1334.

This memory controller 1334 includes, as shown in FIG. 15, cache controllers 13340 to 13343 corresponding to four caches CSH0 to CSH3, an arbitor 13344 for arbitrating the local cache fill requests output from the cache controllers 13340 to 13343 and outputting the same to the global interface 134 (–0 to 31, and a memory interface 13345 for receiving a global cache fill request input via the global interface 134 {–0 to 3} and controlling the data transfer.

Further, the cache controllers 13340 to 13343 have conflict checkers CC10 for receiving two-dimensional addresses COuv00 to COuv03, COuv10 to COuv13, COuv20 to COuv23, and COuv30 to COuv33 required for four neighbor interpolation of the data corresponding to four pixels PX0 to PX3, checking competition of addresses, and distributing them, tag circuits TAG10 for checking addresses distributed by the conflict checkers CC10 and deciding whether or not the data indicated by the addresses in the read only cache 1331 exist, and queue registers QR10.

A tag circuit TAG10 has inside it four tag memories BK10 to BK13 corresponding to the addressing concerning the interleaving of the banks mentioned later. These are stored in the read only cache 1331.

Addresses distributed by a conflict checker CC10 holding the address tags of the block data and the above address tags are compared, flags indicating whether or not they coincide and the above addresses are set in the queue register QR10, and, when they do not coincide, the above addresses are transmitted to the arbitor 13344.

The arbitor 13344 receives addresses transmitted from the cache controllers 13340 to 13343 and performs the arbitration work, selects addresses in accordance with the number of requests which can be simultaneously transmitted via the global interface (GAIF) 134, and outputs the same as local cache fill requests to the global interface (GAIF) 134.

When data is sent from the global cache 12 corresponding to the local cache fill requests transmitted via the global interface (GAIF) 134, it is set in the reorder buffer 1333.

The cache controllers 13340 to 13343 check the flags at the head of the queue register QR10 and, when flags indicating coincidence have been set, reads out the data of the read only cache 1331 based on the addresses at the head of the queue register QR10, and gives it to the processing unit 131. On the other hand, when flags indicating coincidence have not been set, the corresponding data is read out from the at reorder buffer 1333 at the point of time when set in the reorder buffer 1333. The read only cache 1331 is updated by the related block data based on the addresses of the queue register QR10 and output to the processing unit 131.

Next, an explanation will be given of the addressing concerning the interleaving of the banks according to the present embodiment in relation to FIG. 16A to FIG. 16E and FIG. 17A to FIG. 17D (refer to Document: Stanford University "Prefetching in a Texture Cache Architecture").

Figures 16A, 16B, 16C, 16D, 16E:
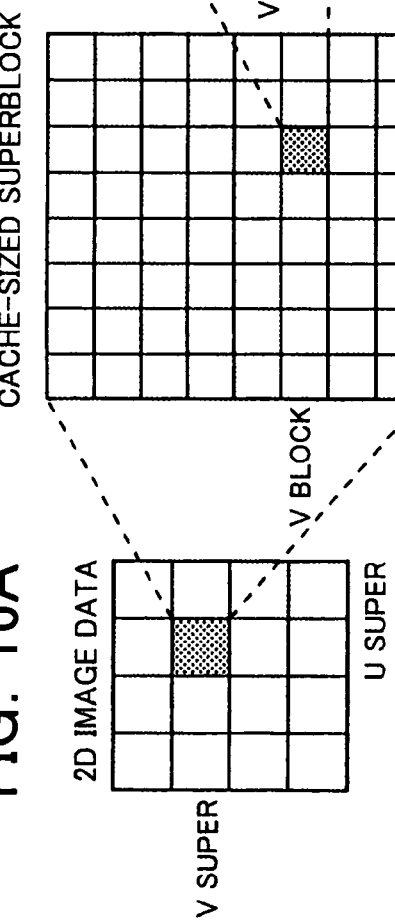
FIG. 16A to FIG. 16E are views for explaining addressing concerning an interleave of a bank according to the present embodiment.

In this case, as shown in FIG. 16A, two-dimensional image data is represented as for example a 4×4 matrix in which V super is plotted in the vertical direction in the figure, and U super is plotted in the horizontal direction.

Then, as shown in FIG. 16B, one block is represented as a matrix of superblock of a 8×8 cache size in which V block is plotted in the vertical direction in the figure, and U block is plotted in the horizontal direction.

In this superblock, as shown in FIG. 16C, numerals 0 to 3 are given to the four neighboring blocks.

Further, one superblock, as shown in FIG. 16D, is comprised of a matrix of 4×4 blocks where V offset is plotted in the vertical direction in the figure, and U offset is plotted in the horizontal direction.

In this block, as shown in FIG. 16E, numerals of 0 to 3 are given to the four neighboring blocks.

Then, by combining V super, V block, and V offset concerning the V-direction and U super, U block, and U offset concerning the U-direction as shown in FIG. 17A, sorting is carried out so as to obtain a V super field, U super field, B block field, U block field, V offset field, and U offset field following each 0 field as shown in FIG. 17B.

Further, by combining areas corresponding to the 0 field to the U block field as shown in FIG. 17C with the base address field, as shown in FIG. 17D, an address comprised of the tag field, block index field, and block offset field is generated.

Next, an explanation will be given of the capacities of the DRAM serving as the memory module, the local caches, and the global cache.

The relationship of the memory capacities is naturally DRAM>global cache>local caches, but the ratio thereof depends upon the application.

The cache block size corresponds to the size of data read out from the memory of the lower level at the time of cache fill.

As a characteristic of the DRAM, the performance falls at the time of random access, but the fact that continuous access of the data belonging to the same row is fast can be mentioned.

The global cache preferably performs the above continuous access for reading the data from the DRAM.

Accordingly, the size of the cache block is set large.

For example, the size of the cache block of the global cache can be made the block size of one DRAM macro row (8292 bits).

On the other hand, in the case of a local cache, when the block size is enlarged, since the ratio of the unused data increases even if put into the cache and since the lower level is the global cache and not the DRAM, there is no need for continuous access, so the block size is set small.

As the block size of a local cache, a value near the size of the rectangular area of the memory interleave is appropriate. In the case of the present embodiment, a value of the amount of 4×4 pixels, that is, 512 bits, is set.

Next, an explanation will be given of texture compression.

A plurality of texture data is required for processing one pixel, so the texture read out band width frequently becomes a bottleneck, but a method of compressing the texture is frequently employed so as to reduce this.

There are various compression methods. In the case of a method able to compress/extend data in small rectangular area units such as 4×4 pixels, preferably the compressed data is placed in the global cache as is and the data after extension is placed in the local caches.

Further, as the relative arrangement of the global module 12 and the local modules 13-0 to 13-3, as shown in FIG. 7, desirably the global module 12 is used as the center and the local modules 13-0 to 13-3 are arranged in the vicinity of the periphery thereof.

Concretely, the local module 13-0 for transferring data with the channel block CBLK0 is arranged in the vicinity of the channel block CBLK0 of the global module 12, the local module 13-1 for transferring data with the channel block CBLK1 is arranged in the vicinity of the channel block CBLK1 of the global module 12, the local module 13-2 for transferring data with the channel block CBLK2 is arranged in the vicinity of the channel block CBLK2 of the global module 12, and the local module 13-3 for transferring data with the channel block CBLK3 is arranged in the vicinity of the channel block CBLK3 of the global module 12.

Due to this, the distances between corresponding channel blocks and local modules can be uniformly kept and the interconnect areas can be orderly arranged, so the average interconnect length can be shortened. Accordingly, the interconnect delay and the interconnect cost can be reduced, so it becomes possible to achieve an improvement of the processing speed.

Next, the operation by the above configuration will be explained.

Here, an explanation will be given of the processing of the texture system.

First, when receiving as input vertex data of the three-dimensional coordinates, normal vector, and texture coordinates, the SDC 11 processes the vertex data.

Next, it calculates DDA parameters such as inclinations of various data (Z, texture coordinates, colors, etc.) required for the rasterization.

Then, the SDC 11 broadcasts the calculated DDA parameters to all local modules 13-0 to 13-3 via the global module 12.

In this processing, the broadcasted parameters are transferred to the local modules 13-0 to 13-3 via the global module 12 by using channels different from those for the cache register mentioned later. Note, this does not affect the content of the global cache.

The local modules 13-0 to 13-3 perform the following processing in the processing units 131-0 to 131-3.

Namely, when receiving the broadcasted parameters, a processing unit 131 (-0 to 3) decides whether or not the triangle belongs to the area it is in charge of, for example, the area interleaved in 4×4 pixel rectangular area units. When the result is that it belongs to it, it rasterizes various data (Z, texture coordinates, colors, etc.)

Next, the calculation at the MipMap level by the LOD (Level of Detail) computation and the (u, v) address computation for the texture access are carried out.

Then, texture reading is carried out.

In this case, the processing units 131-0 to 131-3 of the local modules 13-0 to 13-3 check the entries of the local modules 13-0 to 13-3 at the time of texture reading.

When the result is that there is an entry, the required texture data is read out.

When the required texture data is not in the local caches 133-0 to 133-3, the processing units 131-0 to 131-3 transmit local cache fill requests to the global module 12 through the global interfaces 134-0 to 134-3.

In the global module 12, when it is decided by any of the tag circuits 1204-0 to 1204-3 of the channel blocks CBLK0 to CBLK3 that the requested block data exists in either of the global caches 121-0 to 121-3, this is read out from any of the corresponding global caches 121-0 to 121-3 and returned through the channels 1201-0 to 1201-3 to the local module transmitting the request.

On the other hand, when it is decided in the tag circuits 1204-0 to 1204-3 of the channel blocks CBLK0 to CBLK3 that the requested block data does not exist in any of the global caches 121-0 to 121-3, a global cache fill request is transmitted from any of the intended channels 1202-0 to 1202-3 to the local module holding the related block.

The local module receiving the global cache fill request reads out the corresponding block data from the memory and transmits it through the global interface to the global module 12.

Next, the global module 12 fills the block data in the intended global cache and transmits the data to the local module sending the request from the intended channel.

When the requested block data is sent from the global module 12, the corresponding local module updates the local cache and reads out the block data from the processing unit.

Next, the local modules 13-0 to 13-3 perform filtering such as four neighbor interpolation by using the read out texture data and the decimal portion obtained at the time of calculation of the (u, v) address.

Next, the texture data after filtering and various data after rasterization are used for operation in pixel units.

The pixel data passing the various tests in the processing at the pixel level is written into the memory modules 132-0 to 132-3, for example, the frame buffer and Z-buffer on the built-in DRAM memory.

As explained above, according to the present embodiment, the SDC 11 and the global module 12 transfer the data, a plurality of (four in the present embodiment) local modules 13-0 to 13-3 are connected in parallel to one global module 12, the processing data is shared by a plurality of local modules 13-0 to 13-3 and processed in parallel, the global module 12 has a global cache, the local modules 13-0 to 13-3 have local caches, two levels of the caches include two levels of the global cache shared by four local modules 13-0 to 13-3 and the local caches locally owned by the local modules, therefore, when a plurality of processing devices perform parallel processing by sharing the processing data, the overlapping access can be reduced and a crossbar having a large number of interconnection becomes unnecessary. As a result, there is the advantage that an image processing apparatus easy to design and able to reduce the interconnect cost and interconnect delay can be realized.

Further, according to the present embodiment, as the relative arrangement of the global module 12 and the local modules 13-0 to 13-3, as shown in FIG. 7, the global module 12 is used as the center and the local modules 13-0 to 13-3 are arranged in the vicinity of the periphery thereof, so the distances between the corresponding channel blocks and local modules can be uniformly kept, the interconnect areas can be orderly arranged, and the average interconnect length can be shortened. Accordingly, there are the advantages that the interconnect delay and the interconnect cost can be reduced and an improvement of the processing speed can be achieved.

Note that, in the present embodiment, the description is given by reference to the case where there is texture data on the built-in DRAM, but as another case, it is also possible to place only the color data and z-data in the built-in DRAM and place the texture data in the external memory. In this case, if a gap occurs in the global cache, a cache fill request will be issued to the external DRAM.

Figure 18:
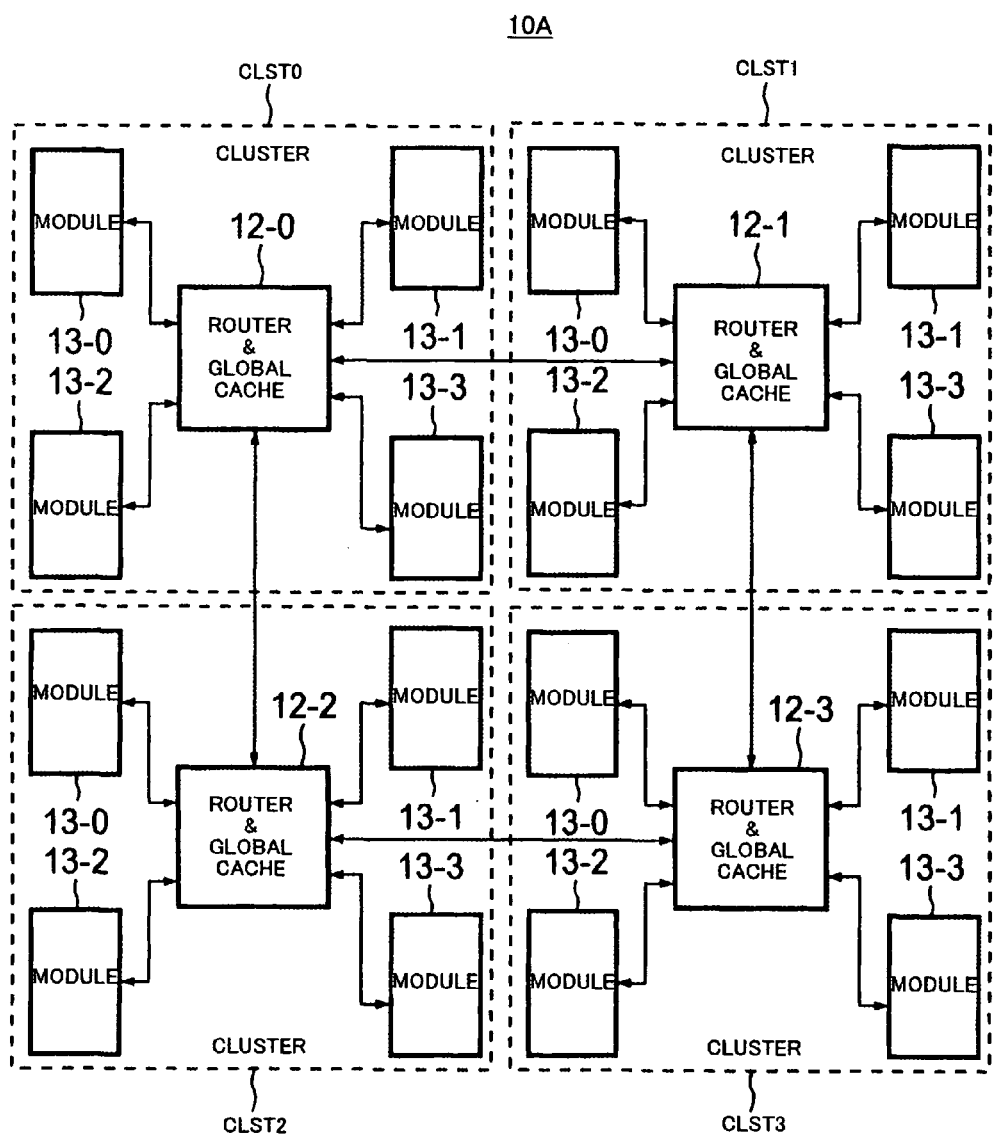
FIG. 18 is a block diagram of the configuration of another embodiment of an image processing apparatus according to the present invention.

Further, the above explanation was made specifying the case of parallel processing taking as an example the configuration of FIG. 7, that is, an image processing apparatus 10 comprising a plurality of (four in the present embodiment) local modules 13-0 to 13-3 connected in parallel to a single global module 12, but it is also possible to use the configuration of FIG. 7 as a single cluster CLST and, for example, as shown in FIG. 18, arrange four clusters CLST0 to CLST4 in a matrix, and transfer data among the global modules 12-0 to 12-3 of the clusters CLST0 to CLST4.

In the example of FIG. 18, the global module 12-0 of the cluster CLST0 and the global module 12-1 of the cluster CLST1 are connected, the global module 12-1 of the cluster CLST1 and the global module 12-3 of the cluster CLST3 are connected, the global module 12-3 of the cluster CLST3 and the global module 12-2 of the cluster CLST2 are connected, and the global module 12-2 of the cluster CLST2 and the global module 12-0 of the cluster CLST0 are connected.

Namely, the global modules 12-0 to 12-3 of a plurality of clusters CLST0 to CLST4 are connected in a ring.

Note that, in the case of the configuration of FIG. 18, it is possible to broadcast the parameters to the global modules 12-0 to 12-3 of CLST0 to CLST4 from one SDC.

By employing such a configuration, higher precision image processing can be realized, and interconnects among clusters are simply connected in one system bi-directionally, therefore the load among clusters can be kept uniform, the interconnect areas can be orderly arranged, and the average interconnect length can be shortened. Accordingly, the interconnect delay and the interconnect cost can be reduced, and it becomes possible to achieve an improvement of the processing speed.

INDUSTRIAL APPLICABILITY

As explained above, in the image processing apparatus and method of the present invention, when a plurality of processing devices share processing data for parallel processing, the overlapping access can be reduced, a crossbar having a large number of interconnections becomes unnecessary, and as a result, the design is easy and the interconnect cost and the interconnect delay can be reduced. Therefore, for example, the invention can be applied to for example an image processing system where a plurality of operation devices share processing data for parallel processing.

The invention claimed is:

1. An image processing apparatus for processing image data in parallel, the apparatus comprising:
   a global module and a plurality of local modules; wherein:
   the global module further comprises a global cache connected in parallel to the local modules, the global cache being configured to store processing data required in the local modules and, when receiving a local cache fill request issued by a local module, the global module outputting the processing data stored in the global cache in response to the request to the local module issuing the request; and
   the local modules further comprise:
   memory modules for storing the image data;
   local caches for storing at least the processing data; and
   processing units for processing memory interleaving in advance based on operation parameters and the processing data stored in the local caches; wherein,
   when the processing data required for processing is absent from the local caches, the local modules output local cache fill requests to the global module for requesting the required porcessing data and update the local caches by the data set from the global module in response to the local cache fill requests.

2. An image processing apparatus as set forth in claim 1, wherein, when receiving a local cache fill request from a local module, said global module checks entries of the global cache and, when there is an entry, reads out the requested block data and transmits the read out data to the local module transmitting the request.

3. An image processing apparatus as set forth in claim 1, wherein,
when receiving a global cache fill request, a local module outputs the requested block data to said global module, and,
when receiving a local cache fill request from a local module, said global module checks the entries of the global cache and, when there is no entry, sends a global cache fill request to a target local module holding the requested block data, updates the global cache by the block data sent from the target local module after that and reads out the block data and transmits the read out data to the local module sending the local cache fill request.

4. An image processing apparatus as set forth in claim 1, wherein,
when receiving a global cache fill request, a local module outputs the requested block data to said global module, and,
when receiving a local cache fill request from a local module, said global module checks the entries of the global cache and, when there is an entry, reads out the requested block data and transmits the read out data to the local module transmitting the request, while, when there is no entry, sends a global cache fill request to a target local module holding the requested block data, updates the global cache by the block data sent from the target local module after that and reads out the block data and transmits the read out data to the local module sending the local cache fill request.

5. An image processing apparatus as set forth in claim 4, wherein:
said global module comprises a plurality of channel blocks provided corresponding to the local modules, and
said plurality of channel blocks transfer local cache fill requests, global cache fill requests, and data with the corresponding local modules.

6. An image processing apparatus as set forth in claim 5, wherein said plurality of local modules are arranged in the vicinity of the periphery of the global module centered around said global module.

7. An image processing apparatus as set forth in claim 5, wherein said plurality of local modules are arranged in the vicinity of the periphery of the global module centered around said global module and in the vicinity of the corresponding channel blocks.

8. An image processing apparatus as set forth in claim 1, wherein:
the apparatus comprises a controller for generating said operation parameters, and
said global module supplies the operation parameters generated at said controller to said plurality of local modules.

9. An image processing apparatus as set forth in claim 1, wherein:
said global module comprises a plurality of channel blocks provided corresponding to the local modules, and
said plurality of channel blocks transfer local cache fill requests and data with the corresponding local modules.

10. An image processing apparatus as set forth in claim 9, wherein said plurality of local modules are arranged in the vicinity of the periphery of the global module centered around said global module.

11. An image processing apparatus as set forth in claim 9, wherein said plurality of local modules are arranged in the vicinity of the periphery of the global module centered around said global module and in the vicinity of the corresponding channel blocks.

12. An image processing apparatus as set forth in claim 1, wherein said parallel processing is parallel processing at the pixel level.

13. An image processing apparatus as set forth in claim 1, wherein said parallel processing is processing concerning texture.

14. An image processing apparatus for processing image data in parallel, the apparatus comprising:
a plurality of clusters each including a global module and a plurality of local modules; wherein:
the global module of each cluster further comprises:
a global cache connected to the local modules in parallel, the global cache being configured to store processing data required in the local modules and, when receiving a local cache fill request from a local module, the global module outputting the processing data stored in the global cache in response to the request ot the local module issuing the request;
the local modules of each cluster further comprise:
memory modules for storing the image data;
local caches for storing at least the processing data; and
processing units for processing memory interleaving in advance based on operation parameters and the processing data stored in the local caches; wherein,
when the processing data required for processing is absent from the local caches, the local modules output local cache fill requests to the global module for requesting the required processing data and update the local caches by the data sent from the global module in response to the local cache fill requests; and
the global modules of the clusters transfer data with each other.

15. An image processing apparatus as set forth in claim 14, wherein said plurality of clusters are arrayed in a matrix, and the global modules of the clusters are connected in a ring.

16. An image processing apparatus as set forth in claim 14, wherein, when receiving a local cache fill request from a local module, said global module checks entries of the global cache and, when there is an entry, reads out the requested block data and transmits the read out data to the local module transmitting the request.

17. An image processing apparatus as set forth in claim 14, wherein,
when receiving a global cache fill request, a local module outputs the requested block data to said global module, and,
when receiving a local cache fill request from a local module, said global module checks the entries of the global cache and, when there is no entry, sends a global cache fill request to a target local module holding the requested block data, updates the global cache by the block data sent from the target local module after that and reads out the block data and transmits the read out data to the local module sending the local cache fill request.

18. An image processing apparatus as set forth in claim 14, wherein,
when receiving a global cache fill request, a local module outputs the requested block data to said global module, and, when receiving a local cache fill request from a local module, said global module checks the entries of the global cache and, when there is an entry, reads out the requested block data and transmits the read out data to the local module transmitting the request, while, when there is no entry, sends a global cache fill request to a target local module holding the requested block data, updates the global cache by the block data sent from the target local module after that and reads out the block data and transmits the read out data to the local module sending the local cache fill request.

19. An image processing apparatus as set forth in claim 14, wherein:
the apparatus comprises a controller for generating said operation parameters, and
said global module supplies the operation parameters generated at said controller to said plurality of local modules.

20. An image processing apparatus as set forth in claim 19, wherein:
said global module comprises a plurality of channel blocks provided corresponding to the local modules, and
said plurality of channel blocks transfer local cache fill requests, global cache fill requests, and data with the corresponding local modules.

21. An image processing apparatus as set forth in claim 14, wherein:
said global module has a plurality of channel blocks provided corresponding to the local modules, and
said plurality of channel blocks transfer local cache fill requests and data with the corresponding local modules.

22. An image processing apparatus as set forth in claim 21, wherein said plurality of local modules are arranged in the vicinity of the periphery of the global module centered around said global module.

23. An image processing apparatus as set forth in claim 21, wherein said plurality of local modules are arranged in the vicinity of the periphery of the global module centered around said global module and in the vicinity of the corresponding channel blocks.

24. An image processing apparatus as set forth in claim 23, wherein said plurality of local modules are arranged in the vicinity of the periphery of the global module centered around said global module.

25. An image processing apparatus as set forth in claim 23, wherein said plurality of local modules are arranged in the vicinity of the periphery of the global module centered around said global module and in the vicinity of the corresponding channel blocks.

26. An image processing apparatus as set forth in claim 14, wherein said parallel processing is parallel processing at the pixel level.

27. An image processing apparatus as set forth in claim 14, wherein said parallel processing is processing concerning texture.

28. An image processing method for processing image data in parallel, the method comprising:

connecting a plurality of local modules in parallel with respect to a global module;
employing two levels of caches including a global cache shared by a plurality of local modules and local caches locally held by the local modules;
storing processing data required by the local modules in the global cache, receiving a local cache fill request from a local module, and, outputting the processing data stored in the global cache in response to the request to the local module issuing the request; and
storing at least the processing data in the local caches, performing memory interleaving in advance based on operation parameters and the processing data stored in the local caches; and,
when the processing data required for processing is absent from the local cache, outputting, from the local modules, local cache fill requests to the global module requesting the required processing data and updating the local caches by the data sent from the global module in response to the requests.

29. An image processing method as set forth in claim 28, wherein when said global module receives a local cache fill request from a local module, it checks the entries of the global cache and, when there is an entry, reads out the requested block data and transmits the read out data to the local module transmitting the request.

30. An image processing method as set forth in claim 28, wherein:
when a local module receives a global cache fill request, it outputs the requested block data to said global module, and
when said global module receives a local cache fill request from a local module, it checks the entries of the global cache and, when there is no entry, sends a global cache fill request to a target local module holding the requested block data, updates the global cache by the block data sent from the target local module after that, reads out the block data, and transmits the read out data to the local module sending the local cache fill request.

31. An image processing method as set forth in claim 28, wherein
when a local module receives a global cache fill request, it outputs the requested block data to said global module, and
when said global module receives a local cache fill request from a local module, it checks the entries of the global cache and, when there is an entry, reads out the requested block data and transmits the read out data to the local module transmitting the request, while when there is no entry, sends a global cache fill request to a target local module holding the requested block data, updates the global cache by the block data sent from the target local module after that, reads out the block data, and transmits the read out data to the local module sending the local cache fill request.

* * * * *